US012498522B2

(12) United States Patent
Dainese, Jr. et al.

(10) Patent No.: US 12,498,522 B2
(45) Date of Patent: Dec. 16, 2025

(54) COMPACT DUAL POLARIZATION COUPLERS FOR MULTI-CORE OPTICAL FIBERS

(71) Applicants: CORNING INCORPORATED, Corning, NY (US); UNIVERSIDADE ESTADUAL DE CAMPINAS, Campinas (BR)

(72) Inventors: Paulo Clovis Dainese, Jr., Painted Post, NY (US); Lucas Heitzmann Gabrielli, São Paulo (BR); Sukru Ekin Kocabas, Corning, NY (US); Julian L Pita Ruiz, Montreal (CA); Lucas Gavião Rocha, Campinas (BR); Jun Yang, Mountain View, CA (US)

(73) Assignee: CORNING INCORPORATED, Corning, NY (US)

( * ) Notice: Subject to any disclaimer, the term of this patent is extended or adjusted under 35 U.S.C. 154(b) by 190 days.

(21) Appl. No.: 18/274,524

(22) PCT Filed: Jan. 31, 2022

(86) PCT No.: PCT/US2022/014506
§ 371 (c)(1),
(2) Date: Jul. 27, 2023

(87) PCT Pub. No.: WO2022/169700
PCT Pub. Date: Aug. 11, 2022

(65) Prior Publication Data
US 2024/0126014 A1     Apr. 18, 2024

Related U.S. Application Data

(60) Provisional application No. 63/146,260, filed on Feb. 5, 2021.

(51) Int. Cl.
| | | |
|---|---|---|
| G02B 6/27 | (2006.01) | |
| G02B 6/02 | (2006.01) | |
| G02B 6/42 | (2006.01) | |

(52) U.S. Cl.
CPC ......... *G02B 6/272* (2013.01); *G02B 6/02042* (2013.01); *G02B 6/4213* (2013.01); *G02B 6/4214* (2013.01); *G02B 6/4249* (2013.01)

(58) Field of Classification Search
CPC .. G02B 6/02042; G02B 6/272; G02B 6/4213; G02B 6/4214; G02B 6/4249
See application file for complete search history.

(56) References Cited

U.S. PATENT DOCUMENTS

| | | |
|---|---|---|
| 7,068,887 B1 | 6/2006 | Gunn, III et al. |
| 8,837,878 B2 | 9/2014 | Chen et al. |

(Continued)

FOREIGN PATENT DOCUMENTS

TW     200636312 A     10/2006

OTHER PUBLICATIONS

Cheng Lirong et al: "Grating couplers on silicon photonics: Design principles, emerging trends and practical issues", Micromachines, vol. 11, No. 7, Jul. 2020, p. 25.

(Continued)

*Primary Examiner* — Daniel Petkovsek
(74) *Attorney, Agent, or Firm* — Svetlana Z. Short

(57) ABSTRACT

A fiber coupler (135) for coupling a plurality of cores (160) of a multi-core optical fiber (105) to an integrated photonic device comprises a grating array comprising a plurality of polarization splitting gratings (180) arranged in a manner that corresponds to the plurality of cores (160) in the multi-core optical fiber (105). The fiber coupler (135) also comprises first and second mode converters (235, 240) extending from first and second sides of each of the plurality (Continued)

of polarization splitting gratings (180) to receive first and second polarization modes of the optical signal scattered by the polarization splitting grating (180). A plurality of waveguides (145-a, 145-b) extends from ends of each of the mode converters (235, 240) to guide a single polarization mode of one of the optical signals.

38 Claims, 9 Drawing Sheets

(56) References Cited

U.S. PATENT DOCUMENTS

| | | | |
|---|---|---|---|
| 9,453,969 | B2 | 9/2016 | Kobyakov et al. |
| 9,709,739 | B1 | 7/2017 | Carpentier et al. |
| 9,766,405 | B2 | 9/2017 | Koonen |
| 9,885,825 | B2 | 2/2018 | Kopp |
| 10,078,190 | B2 | 9/2018 | Doerr et al. |
| 10,234,627 | B1 | 3/2019 | Kojima et al. |
| 10,365,435 | B1 | 7/2019 | Karimelahi et al. |
| 10,884,192 | B1 * | 1/2021 | Hooten ............... G02B 6/34 |
| 11,287,585 | B2 * | 3/2022 | Winzer ............ G02B 6/4206 |
| 11,709,319 | B2 * | 7/2023 | Bhargava ............ G02B 6/272 |
| | | | 385/24 |
| 2006/0239605 | A1 | 10/2006 | Palen et al. |
| 2009/0180734 | A1 | 7/2009 | Fiorentino et al. |
| 2012/0155806 | A1 | 6/2012 | Doerr et al. |
| 2012/0170111 | A1 | 7/2012 | Doerr et al. |
| 2015/0063755 | A1 | 3/2015 | Doany et al. |
| 2016/0306115 | A1 | 10/2016 | Koonen |
| 2018/0045953 | A1 | 2/2018 | Fan et al. |
| 2018/0128977 | A1 | 5/2018 | Huang et al. |
| 2018/0224613 | A1 | 8/2018 | Goi et al. |
| 2019/0049657 | A1 | 2/2019 | Kopp et al. |
| 2020/0064563 | A1 | 2/2020 | Kopp et al. |
| 2020/0158964 | A1 | 5/2020 | Winzer et al. |

OTHER PUBLICATIONS

Ding, Y. et al., "On-chip grating coupler array on the SOI platform for fan-in/fan-out of MCFs with low insertion loss and crosstalk", Opt. Express, vol. 23, 3292, 2015.

Dwivedi, S. et al., "Demonstration of compact silicon nitride grating coupler arrays for fan-out of multicore fibers", In Conference on Lasers and Electro-Optics, ATh3B.4, OSA, 2017.

Dwivedi, S. et al., "Integrated silicon nitride fan-in/fan-out for multi-core fiber interconnects", In Advanced Photonics 2017, IW2A.3, OSA, 2017.

Dwivedi, S. et al., "Multicore fiber link with SiN integrated fan-out and InP photodiode array", IEEE Photonics Technol. Lett. vol. 30, pp. 1921-1924.

Frederik Van Laere et al., "Focusing Polarization Diversity Gratings for Silicon-on-Insulator Integrated circuits", 08 5th IEEE International Conference on Group IV Photonics, Cardiff, 2008, pp. 203-205.

Hayashi, T. et al. End-to-end multi-core fibre transmission link enabled by silicon photonics transceiver with grating coupler array. In 2017 European Conference on Optical Communication (ECOC), 1-3, DOI: 10.1109/ecoc.2017.8346057(IEEE, 2017). ISSN: null.

International Search Report and Written Opinion of the International Searching Authority; PCT/US2022/014506; mailed on May 12, 2022, 18 pages; European Patent Office.

Tong, Y., Zhou, W. & Tsang, H. K. Efficient perfectly vertical grating coupler for multi-core fibers fabricated with 193 nm DUV lithography. Opt. Lett. 43, 5709, DOI: 10.1364/ol.43.005709 (2018).

Watanabe Tatsuhiko, et al, "2-D Grating Couplers for Vertical Fiber Coupling in Two Polarizations", IEEE Photonics Journal, IEEE, vol. 11, No. 4, Aug. 2019 (Aug. 1, 2019), pp. 1-9.

Yunhong Ding, et al., "Reconfigurable SDM Switching Using Novel Silicon Photonic Integrated Circuit," Science Reports 6: 39058, Dec. 2016.

Taiwanese Patent Application No. 111104245, Office Action dated Aug. 8, 2025, 5 pages (English Translation only), Taiwanese Patent Office.

* cited by examiner

COMPACT DUAL POLARIZATION COUPLERS FOR MULTI-CORE OPTICAL FIBERS

CROSS REFERENCE TO RELATED APPLICATIONS

This application claims the benefit of priority under 35 U.S.C. § 371 of International Application No. PCT/US2022/014506, filed on Jan. 31, 2022, which claims the benefit of priority under 35 U.S.C. § 119 of U.S. Provisional Application No. 63/146,260, filed on Feb. 5, 2021, the content of which is relied upon and incorporated herein by reference in its entirety.

FIELD

The present disclosure pertains to optical fiber couplers and, more particularly, to grating couplers for multi-core optical fibers.

TECHNICAL BACKGROUND

Optical fiber transmission systems are employed in data centers and optical networks to optically connect a plurality of different optical devices. To increase the capacity of such optical fiber transmission systems, various spatial division multiplexing techniques have been investigated including multi-core optical fibers. The adoption of such multi-core optical fibers is most beneficial if light can be efficiently coupled from all of the cores. For example, if light from a multi-core optical fiber is being transmitted to an integrated photonic device such as a photonic integrated circuit, grating couplers may be used to couple each core of the multi-core optical fiber to waveguides of the photonic integrated circuit. Existing grating couplers may include gratings and waveguide tapers for directing optical signals from each core of the multi-core optical fiber to one of the waveguides. Such existing gratings and waveguide tapers are structurally incompatible with certain multi-core optical fibers. If a core-to-core separation distance in the multi-core optical fiber is too small, for example, existing grating and waveguide taper combinations may be too bulky to efficiently couple light of both polarization modes from each core to a separate waveguide. As a result, existing grating couplers may result in a loss of polarization diversity in the optical signals, which is not acceptable for high-end communication systems.

SUMMARY

A first aspect of the present disclosure includes an optical system comprising: a multi-core optical fiber comprising a plurality of cores; and a fiber coupler. The fiber coupler comprises a grating array comprising a plurality of polarization splitting gratings disposed on a substrate. The plurality of polarization splitting gratings are arranged in a manner that corresponds to the plurality of cores in the multi-core optical fiber to receive an optical signal from one of the plurality of cores. The plurality of polarization splitting gratings comprises a number of polarization splitting gratings that is less than or equal to the number of cores of said multi-core optical fiber. The fiber coupler also comprises a first mode converter extending from a first side of each of the plurality of polarization splitting gratings to receive a first polarization mode of the optical signal scattered by the polarization splitting grating; a second mode converter extending from a second side of each of the plurality of polarization splitting gratings to receive a second polarization mode of the optical signal scattered by the polarization splitting grating; and a plurality of waveguides extending from ends of each of the mode converters to guide a single polarization mode of one of the optical signals.

A second aspect of the present disclosure includes an optical system according to the first aspect, wherein adjacent ones of the plurality of cores are separated from one another by a minimum core-to-core separation distance that is less than or equal to 45 µm.

A third aspect of the present disclosure includes an optical system according to any of the first through the second aspects, wherein the multi-core optical fiber comprises a total diameter of less than or equal to 125 µm.

A fourth aspect of the present disclosure includes an optical system according to any of the first through the third aspects, wherein the multi-core optical fiber comprises at least 2 cores such that 4 polarization modes are guided by the plurality of waveguides extending from the ends of each of the mode converters.

A fifth aspect of the present disclosure includes an optical system according to any of the first through the fourth aspects, wherein the multi-core optical fiber comprises at least 5 cores such that 10 polarization modes are guided by the plurality of waveguides extending from the ends of each of the mode converters.

A sixth aspect of the present disclosure includes an optical system according to any of the first through the fifth aspects, wherein adjacent ones of the plurality of cores are separated from one another by a minimum core-to-core separation distance that is less than or equal to 35 µm.

An seventh aspect of the present disclosure includes an optical system according to any of the first through the sixth aspects, wherein the first and second sides of the plurality of polarization splitting gratings are at least as long as a mode field diameter of each the plurality of cores.

An eighth aspect of the present disclosure includes an optical system according to any of the first through the seventh aspects, wherein the mode field diameter is greater than or equal to 5 µm and less than or equal to 25 µm.

A ninth aspect of the present disclosure includes an optical system according to any of the first through the eighth aspects, wherein the first and second mode converters extending from each of the plurality of polarization splitting gratings comprise a dimension in a direction perpendicular to propagation directions of the first and second polarization modes that is less than or equal to 1.2 times the mode field diameter.

A tenth aspect of the present disclosure includes an optical system according to any of the first through the ninth aspects, wherein the first and second mode converters extending from each of the plurality of polarization splitting gratings comprise a dimension in the propagation directions of the first and second polarization modes that is less than or equal to the mode field diameter.

An eleventh aspect of the present disclosure includes an optical system according to any of the first through the tenth aspects, wherein each polarization splitting grating and the first and second mode converters extending therefrom comprise a combined cross-sectional area that is less than or equal to 250 µm².

A twelfth aspect of the present disclosure includes an optical system according to any of the first through the eleventh aspects, wherein centers of adjacent polarization splitting gratings of the grating array are separated from one another by a minimum grating separation distance that corresponds to a separation of the plurality of cores.

A thirteenth aspect of the present disclosure includes an optical system according to any of the first through the twelfth aspects, wherein each of the plurality of waveguides is separated from the other waveguides of the plurality of waveguides by at least a minimum waveguide separation distance of 500 nm.

A fourteenth aspect of the present disclosure includes an optical system according to any of the first through the thirteenth aspects, wherein the plurality of waveguides are bent such that the plurality of waveguides extend outside of the grating array.

A fifteenth aspect of the present disclosure includes an optical system according to any of the first through the fourteenth aspects, wherein at least one waveguide of the plurality of waveguides is bent such that, outside of the grating array, an extension direction of the at least one waveguide is changed by at least 90° relative to an initial extension direction thereof at a mode converter end thereof.

A sixteenth aspect of the present disclosure includes an optical system according to any of the first through the fifteenth aspects, wherein at least one waveguide of the plurality of waveguides extends between two of the polarization splitting gratings within the grating array.

A seventeenth aspect of the present disclosure includes an optical system according to any of the first through the sixteenth aspects, wherein each polarization mode of the optical signal is coupled into one of the plurality of waveguides with a coupling efficiency of greater than or equal to −6.0 dB.

An eighteenth aspect of the present disclosure includes an optical system according to any of the first through the seventeenth aspects, wherein each polarization mode of the optical signal is coupled into one of the plurality of waveguides with a coupling efficiency that is greater than or equal to −10 dB and less than or equal to −0.5 dB.

A nineteenth aspect of the present disclosure includes an optical system according to any of the first through the eighteenth aspects, wherein the fiber coupler couples both polarization modes of each optical signal in the plurality of waveguides with a 3 dB coupling efficiency bandwidth of greater than or equal to 50 nm around 1550 nm.

A twentieth aspect of the present disclosure includes an optical system according to any of the first through the nineteenth aspects, wherein each of the first and second mode converters extending from each of the polarization splitting gratings comprises a plurality of nanostructures extending along curved contours, the curved contours extending towards the waveguide extending from that mode converter.

A twenty first aspect of the present disclosure includes an optical system according to any of the first through the second aspects, wherein the plurality of nanostructures comprise a minimum feature size of 100 nm.

A twenty second aspect of the present disclosure includes an optical device for coupling a multi-core optical fiber to a photonic device comprising. The optical device comprises a polarization splitting grating disposed on the substrate, the polarization splitting grating directing light of a first polarization mode in a first propagation direction towards a first side of the polarization splitting grating and light of a second polarization mode in second propagation direction towards a second side of the polarization splitting grating. The the first and second sides are greater than or equal to 10 µm and less than or equal to 15 µm in length. The optical device also includes first and second mode converters extending from the first and second sides of the polarization splitting grating, the first and second mode converters directing the first and second polarization modes in the first and second propagation directions into first and second waveguides extending from the first and second mode converters, respectively. The first and second mode converters comprise lengths along the first and second propagation directions that are less than or equal to the lengths of the first and second sides of the polarization splitting grating.

A twenty third aspect of the present disclosure includes an optical device according to the twenty second aspect, wherein the polarization splitting grating, the first mode converter, and the second mode converter comprise a combined cross-sectional area of less than or equal to 250 µm².

A twenty fourth of the present disclosure includes an optical device according to any of the twenty second through the twenty third aspects, wherein the first and second sides of the polarization splitting grating comprise lengths of greater than or equal to 10 µm.

A twenty fifth of the present disclosure includes an optical device according to any of the twenty second through the twenty fourth aspects, wherein the first and second mode converters comprise lengths along the first and second propagation directions that are greater than or equal to 3 µm and less than or equal to 10 µm.

A twenty sixth of the present disclosure includes an optical device according to any of the twenty second through the twenty fifth aspects, wherein the first and second mode converters direct the first and second polarization modes to the first and second waveguides with insertion losses of greater than or equal to −0.5 dB.

A twenty seventh of the present disclosure includes an optical device according to any of the twenty second through the twenty sixth aspects, wherein the polarization splitting grating is a component of a grating array comprising a plurality of polarization splitting gratings, the plurality of polarization splitting gratings arranged in a manner corresponding to an arrangement of a plurality of cores in the multi-core optical fiber such that each of the plurality of polarization splitting gratings receives an optical signal from one of the cores.

A twenty eighth of the present disclosure includes an optical device according to any of the twenty second through the twenty seventh aspects, further comprising a pair of mode converters extending from first and second sides of each of the plurality of polarization splitting gratings, each mode converter of the pair of mode converters directing a polarization mode of one of the optical signals into waveguides disposed at the end that mode converter.

A twenty ninth of the present disclosure includes an optical device according to any of the twenty second through the twenty eighth aspects, wherein centers of adjacent polarization splitting gratings of the grating array are separated from one another by a minimum grating separation distance that is less than or equal to 50 µm.

A thirtieth of the present disclosure includes an optical device according to any of the twenty second through the twenty ninth aspects, further comprising the multi-core optical fiber being held less than 50 um above the substrate, such that one of the plurality of cores is aligned with one of the plurality of polarization splitting gratings of the grating array.

A thirty first of the present disclosure includes an optical device according to any of the twenty second through the thirtieth aspects, wherein the plurality of cores in the multi-core optical fiber comprise a minimum core-to-core separation distance that is less than or equal to 45 µm.

A thirty second of the present disclosure includes an optical device according to any of the twenty second through the thirty first aspects, wherein adjacent cores of the plurality of cores in the multi-core optical fiber are separated by the minimum core-to-core separation distance and the minimum core-to-core separation distance is greater than or equal to 20 μm and less than or equal to 25 μm.

A thirty third of the present disclosure includes an optical device according to any of the twenty second through the twenty third aspects, wherein the multi-core optical fiber comprises a total diameter of less than or equal to 125 μm.

A thirty fourth of the present disclosure includes a method of coupling light from a multi-core optical fiber to a photonic integrated circuit. The method comprises transmitting a plurality of optical signals from a plurality of cores of the multi-core optical fiber onto a grating array of the photonic integrated circuit, the grating array comprising a plurality of polarization splitting gratings disposed on a substrate, the plurality of polarization splitting gratings arranged in a manner that corresponds to the plurality of cores in the multi-core optical fiber to receive one of the optical signals. The method comprises scattering light of each of the plurality of optical signals at one of the plurality of polarization splitting gratings such that first polarization modes and second polarization modes of the plurality of optical signals are directed in first and second propagation directions, respectively. The method comprises individually directing each of the first polarization modes and the second polarization modes into a plurality of waveguides using mode converters extending from each of the plurality of polarization splitting gratings. The multi-core optical fiber comprises at least 5 cores such that at least 10 different polarization modes are directed into the plurality of waveguides via the mode converters. Adjacent ones of the plurality of cores are separated by a core-to-core separation distance that is less than or equal to 45 μm.

A thirty fifth aspect of the present disclosure includes a method according to the thirty fourth aspect, wherein the multi-core optical fiber comprises a total diameter of less than or equal to 125 μm.

A thirty sixth aspect of the present disclosure includes a method according to any of the thirty fourth through the thirty fifth aspects, wherein the core-to-core minimum separation distance is less than or equal to 35 μm.

A thirty seventh aspect of the present disclosure includes a method according to any of the thirty fourth through the thirty sixth aspects, wherein the multi-core optical fiber comprises at least 2 cores such that at least 4 different polarization modes are directed into the plurality of waveguides via the mode converters.

A thirty eighth aspect of the present disclosure includes a method according to any of the thirty fourth through the thirty seventh aspects, wherein one of the polarization splitting gratings and a pair of the plurality of mode converters extending therefrom comprise a combined cross-sectional area of less than or equal to 250 μm$^2$.

It is to be understood that both the foregoing general description and the following detailed description are merely exemplary and are intended to provide an overview or framework to understand the nature and character of the claims. Additional features and advantages will be set forth in the detailed description which follows, and in part will be readily apparent to those skilled in the art from the description or recognized by practicing the embodiments as described in the written description and claims hereof, as well as the appended drawings.

BRIEF DESCRIPTION OF THE DRAWINGS

The accompanying drawings are included to provide a further understanding, and are incorporated in and constitute a part of this specification. The drawings are illustrative of selected aspects of the present disclosure, and together with the description serve to explain principles and operation of methods, products, and compositions embraced by the present disclosure, in which.

DETAILED DESCRIPTION

Figure 1A:
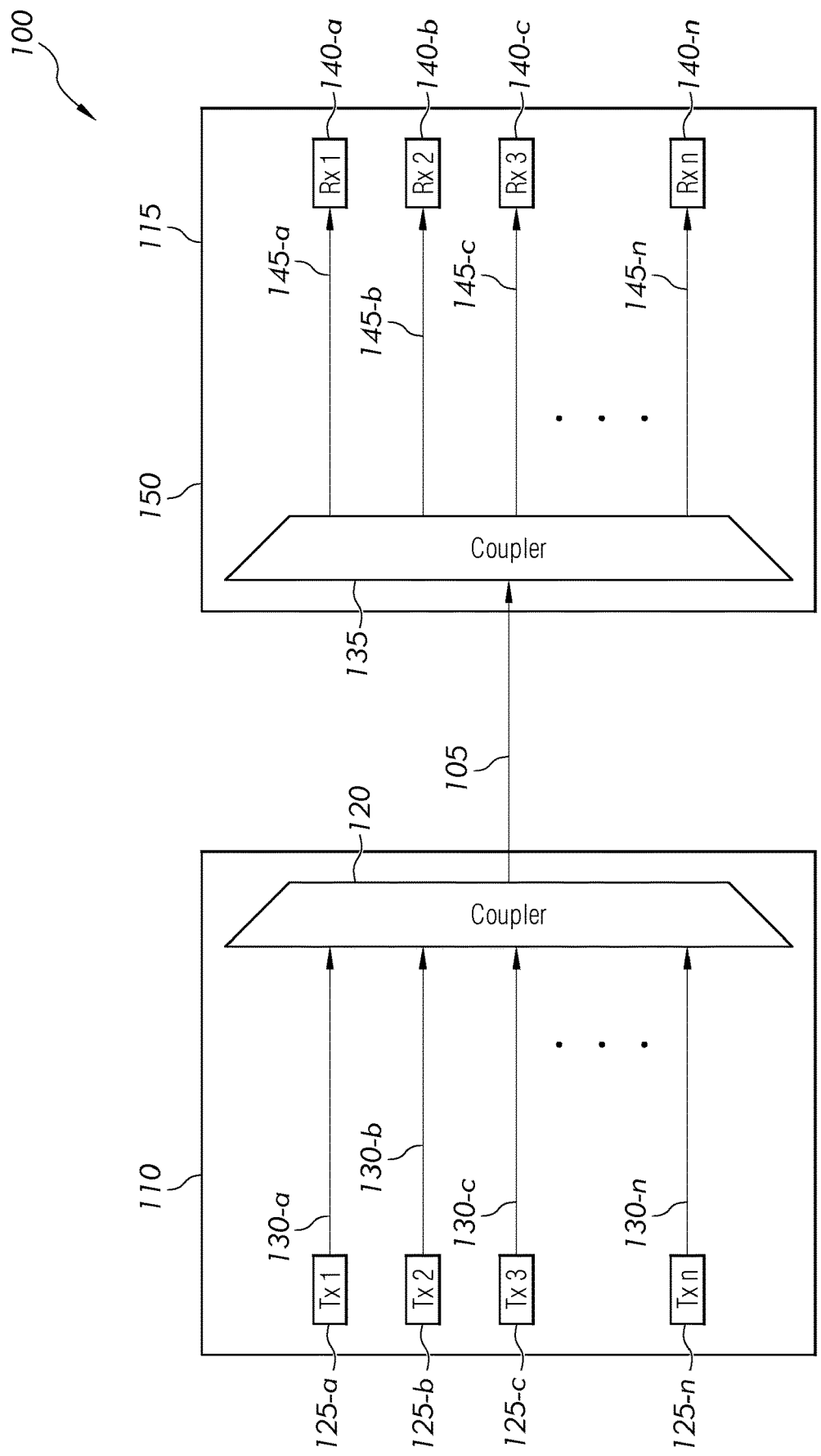
FIG. 1A schematically depicts an optical transmission system comprising a multi-core optical fiber and a grating coupler for transmitting a plurality of optical signals between a first integrated photonic device and a second integrated photonic device, according to one or more embodiments described herein.

Reference will now be made in detail to embodiments of optical systems comprising a multi-core optical fiber and a fiber coupler for coupling a plurality of cores of the multi-core optical fiber to an integrated photonic device. The fiber coupler comprises a plurality of polarization splitting gratings that are arranged in a manner that corresponds to the plurality of cores in the multi-core optical fiber such that each polarization splitting grating receives an optical signal from one of the plurality of cores. First and second mode converters extend from each of the polarization splitting gratings to waveguides that route different polarization modes of the optical signals from the cores to other components of the integrated photonic device. Structures of the polarization splitting gratings and the mode converters extending therefrom are designed for compactness to facilitate arrangement in an array corresponding to the arrangement of cores in the multi-core optical fiber. In embodiments, for example, the first and second mode converters associated with each polarization splitting grating extend from adjacent first and second sides of the polarization splitting grating to guide first polarization modes of the optical signals in a first propagation direction and second polarization modes of the optical signals in a second propagation direction to the waveguides. In embodiments, the first and second mode converters comprise lengths along the first and second propagations directions that are less than or equal to the lengths of the first and second sides of the polarization splitting gratings. In embodiments, each polarization splitting grating, and the first and second mode converters extending therefrom, comprise a combined cross-sectional area of less than or equal to 250 $\mu m^2$. In embodiments, the multi-core optical fiber is held with respect to the multi-core optical fiber at a coupling angle such that each core of the multi-core optical fiber is coupled to one of the polarization gratings. In embodiments, the coupling angle is such that the multi-core optical fiber extends at a non-zero angle with respect to a surface normal of the fiber coupler. In embodiments, the coupling angle is such that the multi-core optical fiber extends perpendicular to the fiber coupler (e.g., a substrate associated therewith).

The compactness of each polarization splitting grating allows polarization diversity to be maintained when coupling the light from certain multi-core fibers to integrated photonic devices. For example, in embodiments, multi-core optical fibers with minimum core-to-core separation distances of less than or equal to 50 $\mu m$ (e.g., less than or equal to 45 $\mu m$, less than or equal to 40 $\mu m$, less than or equal to 35 $\mu m$, less than or equal to 32 $\mu m$, less than or equal to 30 $\mu m$, less than or equal to 25 $\mu m$, less than or equal to 22 $\mu m$) may be coupled to integrated photonic devices via the grating couplers described herein while still maintaining polarization diversity among all of the cores. That is, two different polarization modes of each of the plurality of cores of the multi-core optical fiber may be coupled into a separate waveguide of the integrated photonic device, even when each of the cores is separated from adjacent ones of the plurality of cores by less than or equal to 45 $\mu m$. In view of this, the grating couplers and mode converters described herein facilitate coupling multi-core optical fibers having sizes associated with standard single mode fiber (e.g., less than or equal to 125 $\mu m$) with relatively high core counts (e.g., greater than or equal to 2 cores, greater than or equal to 5 cores, greater than or equal to 7 cores, greater than or equal to 8 cores), while still maintaining polarization diversity. The structure of the polarization splitting gratings and mode converters described herein may be suitable for systems where wavelength division multiplexing is combined with spatial division multiplexing and polarization diversity for high data rates or other space-constrained applications, such as high density fiber arrays.

In this specification and in the claims which follow, reference will be made to a number of terms which shall be defined to have the following meanings:

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the end-points of each of the ranges are significant both in relation to the other end-point, and independently of the other end-point.

A multicore optical fiber, also referred to as a multicore portion or "MC", is considered for the purposes of the present disclosure to include two or more cores disposed within a cladding matrix forming a common cladding. Each core can be considered as having a higher index core region surrounded by a lower index inner cladding. Each core can include a higher index core region surrounded by one or more lower index inner claddings disposed between each core and the cladding matrix of the common cladding.

As used herein, the multicore optical fiber can include a plurality of cores, wherein each core can be defined as an $i^{th}$ core (i.e., $1^{st}$ or first, $2^{nd}$ or second, $3^{rd}$ or third, $4^{th}$ or fourth, etc. . . . ). The $i^{th}$ core can have an outer radius $r_{Ci}$. The $i^{th}$ core is disposed within a cladding matrix of the multicore optical fiber, which defines a common cladding of the multicore optical fiber. The common cladding includes an outer radius $R_{CC}$.

As used herein, the term "adjacent core" refers to the core that is nearest to the reference core. In embodiments, all cores of the multi-core optical fiber may be equally spaced from one another. In other embodiments, the cores may not be equally spaced from one another. In embodiments, some core portions will be spaced further from the reference core portion than adjacent core portions are spaced from the reference core.

As used herein, the term "coupling efficiency" is measured and determined as a percentage of optical power transfer between two optical components, and is calculated as the optical power from the output power (e.g., as measured from a singular waveguide) divided by the optical power from the input (e.g. in a specific core of a multi-core optical fiber).

As used herein, the term "crosstalk" (when not used to describe the crosstalk in a multi-core optical fiber) refers to the optical signal coupling that occurs between waveguides of an integrated photonic device induced by non-idealities present in a fiber-to-chip grating coupler. Crosstalk of coupling to a specific waveguide as described herein may be measured by determining the optical power output from a neighboring waveguide (e.g., a waveguide other than the waveguide for which the crosstalk is being measured) and dividing that measured optical power by the optical power of the signal input to the core of a multi-core optical fiber that is coupled to the waveguide for which crosstalk is being measured.

The mode field diameter (MFD) is measured by determining the radial position in a core of a multi-core optical fiber where the signal intensity falls to $e^{-2}$ times the peak intensity. Unless otherwise specified, "mode field diameter" or "MFD" refers to the mode field diameter at 1550 nm.

Directional terms as used herein—for example up, down, right, left, front, back, top, bottom—are made only with reference to the figures as drawn and are not intended to imply absolute orientation.

Unless otherwise expressly stated, it is in no way intended that any method set forth herein be construed as requiring that its steps be performed in a specific order, nor that with any apparatus specific orientations be required. Accordingly, where a method claim does not actually recite an order to be followed by its steps, or that any apparatus claim does not actually recite an order or orientation to individual components, or it is not otherwise specifically stated in the claims or description that the steps are to be limited to a specific order, or that a specific order or orientation to components of an apparatus is not recited, it is in no way intended that an order or orientation be inferred, in any respect. This holds for any possible non-express basis for interpretation, including: matters of logic with respect to arrangement of steps, operational flow, order of components, or orientation of components; plain meaning derived from grammatical organization or punctuation, and; the number or type of embodiments described in the specification.

As used herein, the singular forms "a," "an" and "the" include plural referents unless the context clearly dictates otherwise. Thus, for example, reference to "a" component includes aspects having two or more such components, unless the context clearly indicates otherwise.

FIG. 1A schematically depicts an optical transmission system 100. The optical transmission system 100 comprises a transmitting optical device 110, a receiving optical device 115, and a multi-core optical fiber 105 extending between the transmitting optical device 110 and the receiving optical device 115. The transmitting optical device 110 and the receiving optical device 115 may take a variety forms depending on the context of the optical transmission system 100. In embodiments, one or more of the transmitting optical device 110 and the receiving optical device 115 is an integrated photonic device, in which at least portions of the components thereof form a photonic integrated circuit disposed on a common substrate. For example, in embodiments, the transmitting optical device 110 comprises a first integrated photonic device and the receiving optical device 115 comprises a second integrated photonic device. In embodiments, the transmitting optical device 110 and the receiving optical device 115 may be, for example, systems implemented at a central office (CO), a headend, a switching center, or the like. In embodiments, the transmitting optical device 110 and the receiving optical device 115 may be implemented at a consumer premises equipment (CPE) or other device. The optical transmission system 100 may be used for inter data center communications and intra data center communications. The grating couplers described herein may be used in both pluggable optics as well as co-packaged optics. While examples are described herein for communications at a 1550 nm wavelength, the optical transmission system 100 may operate at other wavelengths consistent with the present disclosure (e.g., 1310 nm).

In the depicted embodiment, the transmitting optical device 110 comprises a plurality of transmitters 125 and a plurality of optical communications links 130 coupled to the plurality of transmitters 125. For example, a first transmitter 125-a may be configured to generate a first optical signal that is coupled into a first one of the optical communications links 130-a. The transmitting optical device 110 may comprise n transmitters 125 and optical communications links 130 such that n different optical signals are generated and coupled into separate ones of the plurality of optical communications links 130. In embodiments, the plurality of optical communications links 130 comprise a plurality of optical fibers (e.g., single mode optical fibers or multi-mode optical fibers) routing the plurality of optical signals from the plurality of transmitters 125 to a coupler 120. In embodiments, the plurality of optical communications links 130 comprise a plurality of waveguides routing the plurality of optical signals from the plurality of transmitters to the coupler 120. Depending on the implementation, each of the plurality of optical signals generated by the plurality of transmitters 125 may comprise two polarization modes propagating through the optical communications links 130.

In embodiments, the coupler 120 of the transmitting optical device 110 is configured to couple one of the plurality of optical signals generated by the plurality of transmitters 125 into a core of the multi-core optical fiber 105. It should be appreciated that, in embodiments, the coupler 120 may have a structure similar to that of the coupler 135 described herein. That is, the polarization splitting grating-based couplers described herein may be operated in reverse to specific examples described herein to couple a plurality of waveguides into the multi-core optical fiber 105.

Depending on the implementation, the multi-core optical fiber 105 may have various lengths. In embodiments, the optical transmission system 100 may be used for both short-distance optical communication systems (e.g., for connections within data centers) and long-haul optical communication systems (e.g., for inter-data center connections, metropolitan environments, submarine environments such as transcontinental optical communication link). As will be appreciated, such applications may utilize multi-core optical fibers having differing lengths.

In embodiments, the multi-core optical fiber 105 comprises a plurality of cores disposed within a cladding matrix forming a common cladding. Each core can be considered as having a higher index core region surrounded by a lower index inner cladding. Each core can include a higher index core region surrounded by one or more lower index inner claddings disposed between each core and the cladding matrix of the common cladding. In embodiments, the coupler 120 comprises an optical fiber fan-in device such as a tapered fiber-based coupler, a lens coupling system, a waveguide-based coupler, or a grating-based coupler to couple the optical signals propagating through the plurality of optical communications links 130. In embodiments, the multi-core optical fiber 105 comprises a number of cores that correspond to the number of transmitters in the plurality of transmitters 125 such that each optical signal generated thereby is coupled into a second core of the multi-core optical fiber 105.

In embodiments, the multi-core optical fiber 105 comprises a structure configured based on additional components of the optical transmission system 100. For example, components such as switches, detectors, and other components of the receiving optical device 115 may be configured for operation with optical fibers having outer diameters of 150 µm or less (e.g., 125 µm) and mode field diameters of less than or equal 15 µm (e.g., 10 µm, 8 µm, etc.). Additionally, to maximize data transmission rates, it may be beneficial if the multi-core optical fiber 105 comprises at least 2 cores (e.g., greater than or equal 3 cores, greater than or equal to 4 cores, greater than or equal to 5 cores, greater than or equal to 6 cores, greater than or equal to 7 cores, greater than or equal to 8 cores). Confining such numbers of cores within the multi-core optical fiber 105 operating within such size constraints result in the plurality of cores of the multi-core optical fiber 105 being relatively close to one another. For example, in embodiments, adjacent ones of the plurality of cores of the multi-core optical fiber 105 are separated from one another by a minimum core-to-core separation distance that is less than or equal to 50 µm (e.g., less than or equal to 45 µm, less than or equal to 40 µm, less than or equal to 35 µm, less than or equal to 32 µm, less than or equal to 30 µm, less than or equal to 25 µm, less than or equal to 22 µm). Such core-to-core spacing creates challenges for coupling the optical signals propagating through the multi-core optical fiber to the receiving optical device 115.

In the depicted embodiment, the receiving optical device 115 is an integrated photonic device in which a plurality of components thereof are disposed on a substrate 150. The receiving optical device 115 comprises a coupler 135, a plurality of optical communications links 145, and a plurality of receivers 140. In the embodiments described herein, the coupler 135 comprises a grating coupler including a plurality of polarization splitting gratings arranged in a manner to that corresponds to the arrangement of cores in the multi-core optical fiber 105. An end of the multi-core optical fiber 105 may be held in spaced relation to the substrate 150 such that each core of the multi-core optical fiber 105 is aligned with one of the polarization splitting gratings of the grating array such that one of the optical signals generated by the transmitting optical device 110 is scattered by one of the polarization splitting gratings. As described herein, one of the plurality of optical signals may include multiple polarization modes. In such cases, the polarization splitting gratings may direct light of a first polarization mode of one of the optical signals in a first propagation direction and light of a second polarization mode of the optical signal in a second propagation direction. The grating array may comprise mode converters extending from two sides of each of the plurality of polarization splitting gratings to couple each of the first and second polarization modes associated with the optical signal to one of the plurality of optical communications links 145. For example, a first one of the optical communications links 145-a may receive a first polarization mode of a first optical signal generated by the transmitting optical device 110 and a second one of the optical communications links 145-b may receive a second polarization mode of the first optical signal. In embodiments, the transmitting optical device includes n optical communications links 145, where n corresponds to the number of optical signals generated by the transmitting optical device 110. In embodiments, the number of optical communications links 145 of the receiving optical device 115 comprises at least double the number of polarization splitting gratings of the coupler 135. While in the depicted embodiment, the transmitting optical device 110 and the receiving optical device 115 both include the same number of optical communications links (i.e., the transmitting optical device 110 includes n optical communications links 130 and the receiving optical device 115 includes n optical communications links 145), it should be appreciated that embodiments are also contemplated in which the transmitting optical device 110 and receiving optical device 115 include unequal numbers of optical communications links.

In embodiments, the plurality of optical communications links 145 of the receiving optical device 115 comprise a plurality of waveguides formed in a layer of the substrate 150 (or a layer disposed on the substrate 150). For example, as described herein, the optical communications links 145 may comprise a plurality of waveguides formed in the same layer of material as the plurality of polarization splitting gratings of the coupler 135. The plurality of receivers 140 are configured to receive the optical signals propagating through the plurality of optical communications links 145 and perform operations thereon. In embodiments, for example, the plurality of receivers 140 are inputs of an optical switch or the like for routing the plurality of optical signals to different components of the receiving optical device 115. In embodiments, the plurality of receivers 140 convert the optical signals guided thereto into electrical signals for additional operations in a photonic integrated circuit.

Figure 1B:
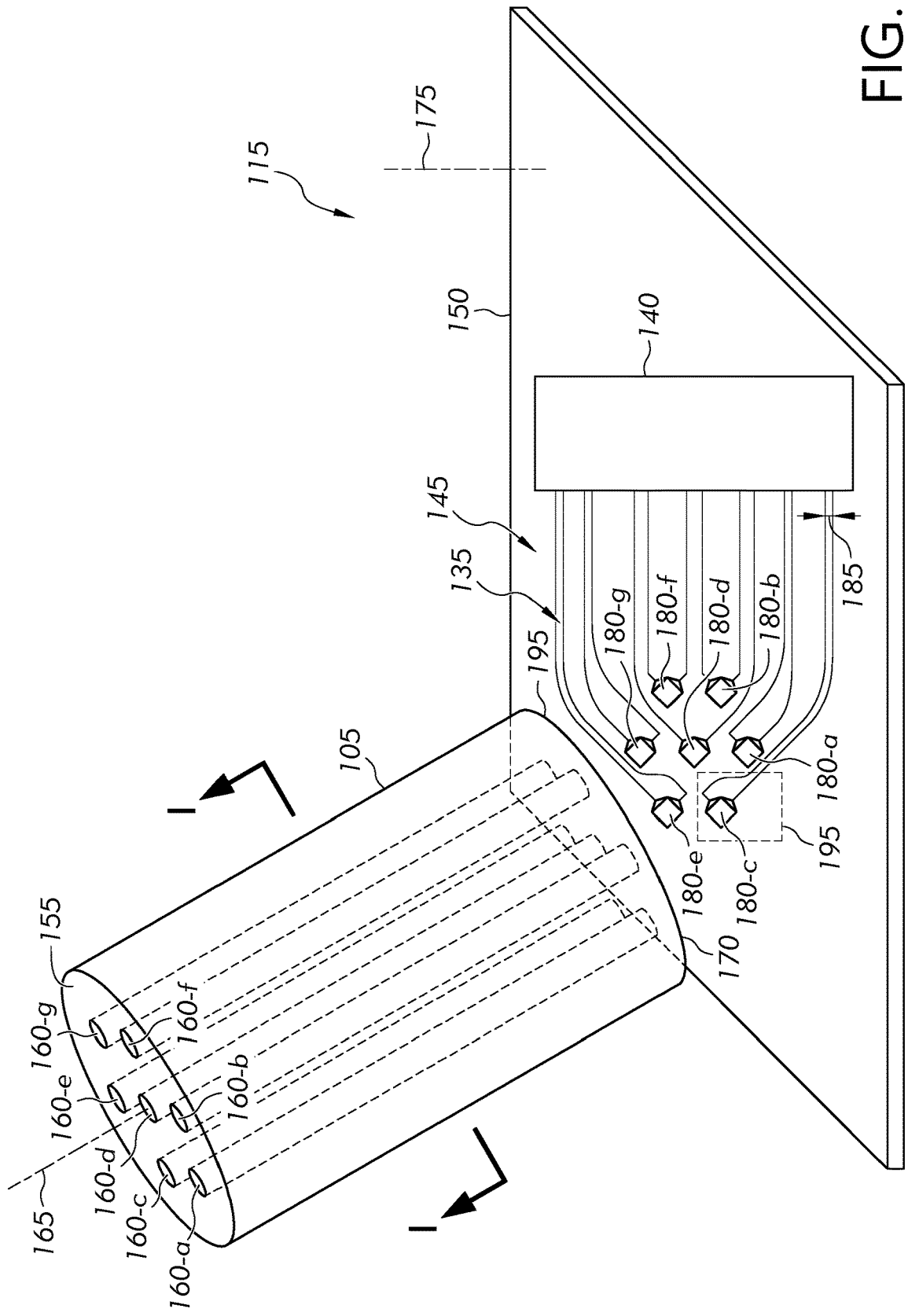
FIG. 1B schematically depicts the multi-core optical fiber and grating coupler of the optical transmission system depicted in FIG. 1A, according to one or more embodiments described herein.

Referring now to FIG. 1B, an interface between the multi-core optical fiber 105 and the coupler 135 of the optical transmission system of FIG. 1A is depicted in greater detail, according to an example embodiment. In the depicted embodiment, the multi-core optical fiber 105 comprises a plurality of cores 160 disposed in a common cladding 155. The plurality of cores 160 comprises a first core 160-a, a second core 160-b, a third core 160-c, a fourth core 160-d, a fifth core 160-e, a sixth core 160-f, and a seventh core 160-g. The multi-core optical fiber 105 also comprises a central axis 165 extending through a longitudinal centerline of the multi-core optical fiber 105. In embodiments, the multi-core optical fiber 105 is held in spaced relation to the substrate 150 (e.g., via a fiber unit, not depicted) such that an end 170 of the multi-core optical fiber 105 is disposed proximate to the coupler 135. In embodiments, the end 170 of the multi-core optical fiber 105 is fixed onto the substrate 150 via an adhesive. In embodiments, the multi-core optical fiber 105 is positioned relative to the substrate 150 such that the central axis 165 extends at an angle to a surface normal 175 of the substrate 150. In embodiments, the angle is configured to maximize coupling efficiency between each of the plurality of cores 160 and one of the plurality of polarization splitting gratings 180 of the coupler 135. In embodiments, the angle between the central axis 165 and the surface normal 175 of the substrate 150 is greater than or equal to 5° (e.g., greater than or equal to 7°, greater than or equal to 10°, greater than or equal to 12°) to maximize coupling efficiency and beneficially reduce back-scattering of light back into the plurality of cores 160. The structure of the multi-core optical fiber 105 will be described in greater detail herein with respect to FIG. 1E.

In the depicted embodiment, the end 170 of the multi-core optical fiber 105 is perpendicular to the central axis 165. It should be understood that, in embodiments, the multi-core optical fiber 105 is cut with a non-zero cleaving angle to diminish reflections at the end 170 of the multi-core optical fiber 105. It should be understood that similar coupling results are attained with the multi-core optical fiber being polished at an angle so that the fiber end 170 extends substantially parallel to the substrate 150. Such end-face polishing of the multi-core optical fiber 105 may beneficially result in uniform coupling amongst the plurality of cores and reduced backscattering into the multi-core optical fiber 105

In the embodiment depicted in FIG. 1B, the coupler 135 is a grating coupler comprising a plurality of polarization splitting gratings 180. In embodiments, the plurality of polarization splitting gratings 180 are arranged in a manner corresponding to the plurality of cores 160 in the multi-core optical fiber 105. For example, in embodiments, the plurality of polarization splitting gratings 180 comprises a first polarization splitting grating 180-a, second polarization splitting grating 180-b, third polarization splitting grating 180-c, third polarization splitting grating 180-c, fifth polarization splitting grating 180-e, sixth polarization splitting grating 180-f, and seventh polarization splitting grating 180-g. That is, the coupler 135 comprises the same number of polarization splitting gratings as there are cores in the multi-core optical fiber 105. The multi-core optical fiber 105 may be held in spaced relation to the substrate 150 such that one of the seven optical signals propagating through one of the plurality of cores 160 is coupled into a pair of the plurality of optical communications links 145 via a corresponding one of the plurality of polarization splitting gratings 180. For example, a first pair of optical signals (with orthogonal polarizations) propagating through the first core 160-a of the multi-core optical fiber 105 may be directed to the first polarization splitting grating 180-a of the coupler 135, a second pair of optical signals propagating through the second core 160-b of the multi-core optical fiber 105 may be directed to the second polarization splitting grating 180-b of the coupler 135, and so on. In embodiments, the plurality of polarization splitting gratings 180 comprises the same arrangement (e.g., a minimum grating-grating separation distance between corresponding points on adjacent gratings may be the same as a minimum core-to-core separation distance of the plurality of cores 160).

As described herein, in embodiments, at least one of the plurality of cores 160 of the multi-core optical fiber 105 may have multiple optical signals with two different polarization modes propagating therethrough. For example, the plurality of optical signals propagating through the plurality of cores 160 may be decomposed into two orthogonal polarization modes: a LP01-x polarization mode and a LP01-y polarization mode. To independently couple both modes associated with each of the plurality of optical signals into separate ones of the plurality of optical communications links 145, each of the plurality of polarization splitting gratings 180 comprises an array of scattering elements designed to scatter each polarization mode in a different direction. For example, in embodiments each of the plurality of polarization splitting gratings 180 comprises a superimposed two-dimensional grating comprising two arrays of scattering elements arranged to direct each polarization mode of each optical signal in a different propagation direction. The structure of the plurality of polarization splitting gratings 180 is described in greater detail herein with respect to FIG. 1C.

As depicted in FIG. 1B, a pair of the plurality of optical communications links 145 extends from each of the plurality of polarization splitting gratings 180. As described herein, the plurality of optical communications links 145 may comprise a plurality of waveguides formed on the substrate 150. The plurality of waveguides may be positioned to receive one of the orthogonal polarization modes scattered by each of the plurality of polarization splitting gratings 180. As described herein, the pair of waveguides extending from each of the plurality of polarization splitting gratings 180 may extend from mode converters contacting sides of each of the plurality of polarization splitting gratings. The mode converters generally function as spot-size converters for focusing light from the optical signals diffracted by the polarization splitting gratings 180 to be compatible with the propagation mode parameters associated with the plurality of waveguides. In embodiments, the waveguides are structured based on the wavelength of the optical signals propagating through the multi-core optical fiber 105 as well as the respective refractive indices of materials out of which the receiving optical device 115 is constructed (e.g., layers in which the plurality of polarization splitting gratings 180 and the mode converters are formed). In embodiments, the plurality of polarization splitting gratings 180 are substantially square-shaped, with lengths substantially corresponding to the mode field diameter of each core of the plurality of cores 160 (e.g., greater than or equal to 8 μm, greater than or equal to 10 μm). The plurality of waveguides, may comprise nominal widths (e.g., in the plane parallel to the substrate 150) of less than or equal to 5 μm (e.g., less than or equal to 500 nm). As such, the mode converters may shrink the spot size associated with the optical signal by at least 10 times (e.g., at 20 times) to facilitate coupling with the plurality of waveguides. The structure of the mode converters is described in greater detail herein with respect to FIG. 1C.

In the depicted embodiment, the coupler 135 comprises seven polarization splitting gratings 180, and pairs of mode converters and optical communications links 145 extending from each of the plurality of polarization splitting gratings 180. As such, the receiving optical device comprises 14 optical communications links 145 that are waveguides extending between each of the plurality of polarization splitting gratings 180 and the plurality of receivers 140. Each of the waveguides couples one polarization mode associated with one of the plurality of optical signals propagating through the multi-core optical fiber 105 into the plurality of receivers 140. As described herein, the sizing of various components of the coupler 135 (e.g., the polarization splitting gratings 180 and the mode converters extending therefrom) facilitates maintaining polarization diversity in the optical signals upon coupling into the receiving optical device 115.

The routing of the plurality of optical communications links 145 is also designed to maximize coupling efficiency between the plurality of cores 160 and the plurality of receivers 140. In the depicted embodiment, for example, the plurality of optical communications links 145 do not intersect one another in extending between the coupler 135 and the plurality of receivers 140 to reduce signal losses associated with signal interactions at waveguide intersections. In embodiments, each of the plurality of optical communications links 145 is separated from all of the other ones of the plurality of optical communications links 145 by a least a minimum waveguide separation distance 185. In embodiments, the minimum waveguide separation distance 185 is greater than or equal to 500 nm (e.g., greater than or equal to 1 μm) to minimize crosstalk between the polarization modes of the optical signals in the process of coupling the multi-core optical fiber 105 to the plurality of receivers 140.

Due to the spacing between the plurality of cores 160 of the multi-core optical fiber 105, the plurality of polarization splitting gratings 180 are also relatively close to one another. Such close grating-to-grating spacing, coupled with the number of polarization modes being coupled to the plurality of receivers 140, necessitates careful design of the routing of the plurality of optical communications links 145 between the coupler 135 and the plurality of receivers 140. In the depicted embodiment, each of the plurality of the optical communications links 145 comprises at least one bend 195 in which an extension direction thereof changes so as to not intersect with any other components of the receiving optical device 115. In embodiments, the at least one bend 195 of each of the plurality of optical communications links comprises a radius of curvature that is greater than or equal to 5 µm to diminish signal losses occurring at the at least one bend 195. As such, the compactness of the components of the coupler 135 facilitates maintaining polarization diversity of optical signals propagating through a multi-core optical fiber 105 comprising a relatively high core density, while enabling routing of the waveguides to minimize signal losses. That is, both polarization modes associated with each of the optical signals propagating through the multi-core optical fiber 105 may be coupled into the receiving optical device 115 with a relatively high coupling efficiency. In embodiments, each polarization mode associated with one of the plurality of optical signals propagating through the multi-core optical fiber 105 is coupled into one of the plurality of optical communications links 145 with a coupling efficiency that is greater than or equal to −6.0 dB. The structure of the plurality of polarization splitting gratings 180 and mode converters extending therefrom will now be described in greater detail.

Figure 1C:
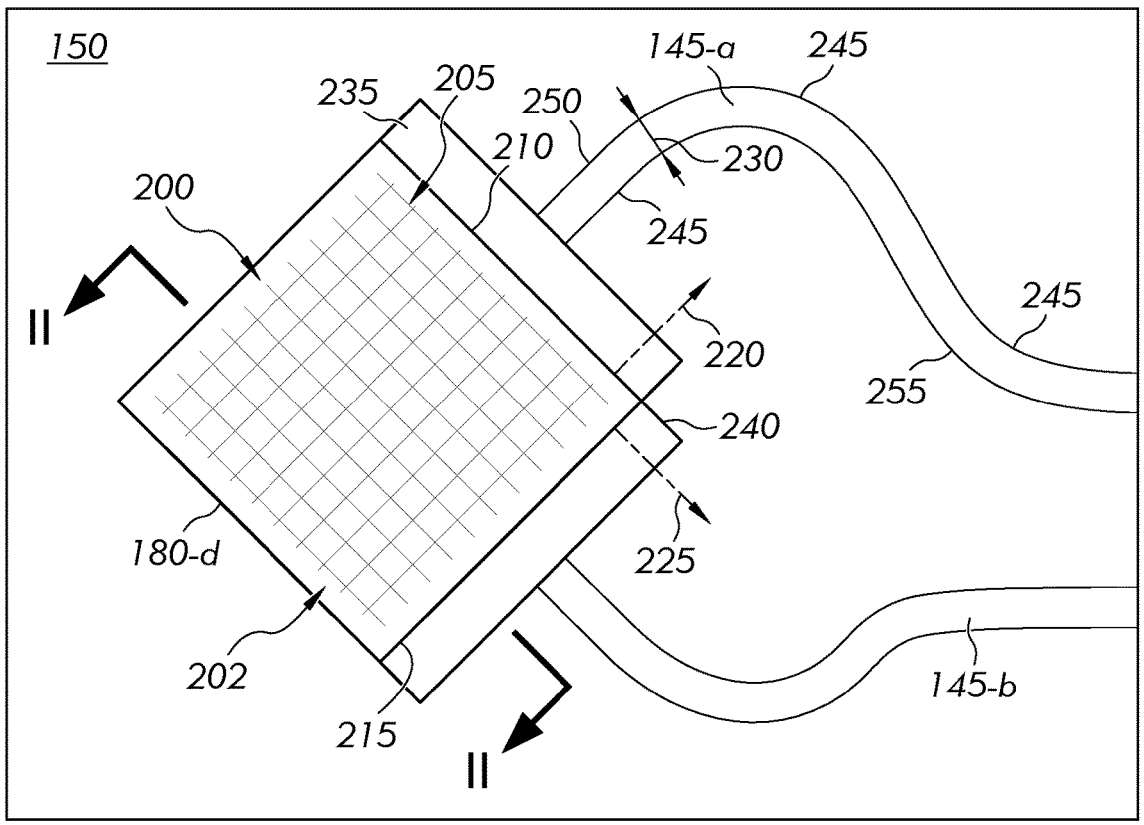
FIG. 1C schematically depicts a polarization splitting grating and a pair of mode converters extending therefrom of the grating coupler depicted in FIG. 1B, according to one or more embodiments described herein.

FIG. 1C depicts a close-up view of the area 190 of the receiving optical device 115 depicted in FIG. 1B. The third polarization splitting grating 180-c is depicted as a superposition cross grating comprising a first plurality of scattering elements 200 and a second plurality of scattering elements 205. The first plurality of scattering elements 200 comprises an array of nanostructures (e.g., pillars, cavities, or the like) arranged in rows that extend perpendicular to a first propagation direction 220. The first plurality of scattering elements 200 may be spaced apart from one another in the rows so as to scatter light at the wavelength of the optical signals propagating through the multi-core optical fiber 105 in the first propagation direction 220 towards a first side 210 of the third polarization splitting grating 180-c. The second plurality of scattering elements 205 comprises an array of nanostructures (e.g., pillars, cavities, or the like) arranged in rows that extend perpendicular to a second propagation direction 225. The second plurality of scattering elements 205 may be spaced apart from one another in the rows so as to scatter light at the wavelength of the optical signals propagating through the multi-core optical fiber 105 in the second propagation direction 225 towards a second side 215 of the third polarization splitting grating 180-c. As such, both the LP01-x and LP01-y modes of an optical signal propagating through the third core 160-c of the multi-core optical fiber (see FIG. 1B) may be scattered and propagate in two different propagation directions as a result of interacting with the third polarization splitting grating 180-c.

In embodiments, lengths of the first and second sides 210 and 215 of the third polarization splitting grating 180-c may correspond to a mode field diameter of the third core 160-c of the multi-core optical fiber 105, which may be greater than or equal to 5 µm (e.g., greater than or equal to 8 µm, greater than or equal to 10 µm). In embodiments, the lengths of the first and second sides 210 and 215 are greater than the mode field diameters. Mode converters extend from the first and second sides 210 and 215 to re-size the scattered light for propagation down one of the plurality of optical communications links 145. For example, as depicted, a first mode converter 235 extends from the first side 210 of the third polarization splitting grating 180-c to couple light of a first polarization mode into the first optical communications link 145-a. A second mode converter 240 extends from the second side 215 of the third polarization splitting grating 180-c to couple light of a second polarization mode into the second optical communications link 145-b. In the depicted embodiment, the first and second optical communications links 145-a and 145-b comprise waveguides (e.g., a strip loaded waveguide, a channel waveguide, a rib waveguide, or a ridge waveguide) formed on the substrate 150. The waveguides may comprise a nominal width 230 (e.g., in the plane parallel to the substrate 150) of less than or equal to 1 µm (e.g., less than or equal to 500 nm, less than or equal to 450 nm), depending on the thickness thereof and the material out of which the waveguides are constructed.

The first and second mode converters 235 and 240 re-size the polarization modes scattered by the third polarization splitting grating 180-c for coupling into the first and second optical communications links 145-a and 145-b. Existing grating couplers typically utilize tapered waveguide-based couplers having lengths of greater than 100 µm to perform such mode conversion. The sizing of such tapered waveguide-based couplers renders maintaining polarization diversity for certain multi-core optical fibers difficult, as the combination of the polarization splitting gratings and tapered waveguides have too large of a surface area footprint for arrangement with coupling of each of the cores of the multi-core optical fiber. Accordingly, in embodiments, the first and second mode converters 235 and 240 are iteratively designed using an objective function that satisfies constraints associated with coupling light at the first and second sides 210 and 215 of the third polarization splitting grating 180-c into the waveguides. Such constraints may restrict the size of the first and second mode converters 235 and 240, and the algorithm may output arbitrary discretized permittivity distributions that may convert the spot size associated with the polarization modes for coupling into the waveguides given the size constraints. In embodiments, the first and second mode converters 235 and 240 are designed to have widths along the propagation direction through which the light propagates therethrough (i.e., along the first and second propagation directions 220 and 225, respectively) that is less than the mode field diameters of the plurality of cores 160 of the multi-core optical fiber (e.g., less than or equal to 25 µm, less than or equal to 15 µm, less than or equal to 10 µm, less than or equal to 8 µm). In embodiments, the first and second mode converters 235 and 240 are designed to have widths in a direction perpendicular to the propagations direction through which the light propagates therethrough (e.g. parallel to the first and second sides 210 and 215) that is less than or equal to 2.0 times the mode field diameter (e.g., less than or equal to 1.2 times the mode field diameter) of the plurality of cores of the multi-core optical fiber (e.g., less than or equal to 50 µm, less than or equal to 30 µm, less than or equal to 20 µm). Given such size constraints, the iterative technique may output a first discretized permittivity distribution for the first mode converter 235 and a second discretized permittivity distribution for the second mode converter 240 that couples each polarization mode into the first and second optical communications links 145-a and 145-b, respectively. Such discretized permittivity distributions may be formed via lithography techniques using a predetermined minimum feature size (e.g., 50 nm, 100 nm, 200 nm).

In embodiments, the combination of the third polarization splitting grating 180-c, the first mode converter 235, and the second mode converter 240 comprises a cross-sectional area that is less than or equal to 300 µm$^2$ (e.g., less than or equal to 250 µm$^2$, less than or equal to 225 µm$^2$, less than or equal to 200 µm$^2$). Such a minimal footprint associated with each grating of the coupler 135 facilitates arrangement of the plurality of polarization splitting gratings 180 in a manner that corresponds to the arrangement of cores 160 of the multi-core optical fiber 105, even when the plurality of cores 160 are relatively tightly packed (e.g., comprise a minimum core-to-core separation distance that is less than or equal to 45 μm). Such multi-polarization coupling for every core of a multi-core optical fiber 105 having such tightly packed cores has not yet been achieved using conventional tapered-waveguide-based mode converters.

Within the coupler 135, the third polarization splitting grating 180-*c* is more distant from the plurality of receivers 140 than other ones of the plurality of polarization splitting gratings 180 (see FIG. 1B). That is, components of the coupler 135 (e.g., the second polarization splitting grating 180-*b* and the mode converters and waveguides associated therewith) lie between the third polarization splitting grating 180-*c* and the plurality of receivers 140. Given this, the first and second optical communications link 145-*a* and 145-*b* may take indirect routes to avoid intersection with such other components. As depicted in FIG. 1C, the first optical communications link 145-*a* comprises a plurality of bends 245 where the extension direction thereof changes. At a first end 250 thereof, the first optical communications link 145-*a* extends substantially parallel to the first propagation direction 220, whereas, at a second portion 255 thereof, the first optical communications link 145-*a* extends in a direction that extends at an angle that is greater than or equal to 90° relative to the first propagation direction 220. That is, by bending the paths of the waveguides, the propagation direction for any of the polarization modes may be changed by over 90 degrees within the coupler 135 to route the light around the various other components associated with the coupler 135 in order to avoid intersection and/or signal loss.

Figure 1D:
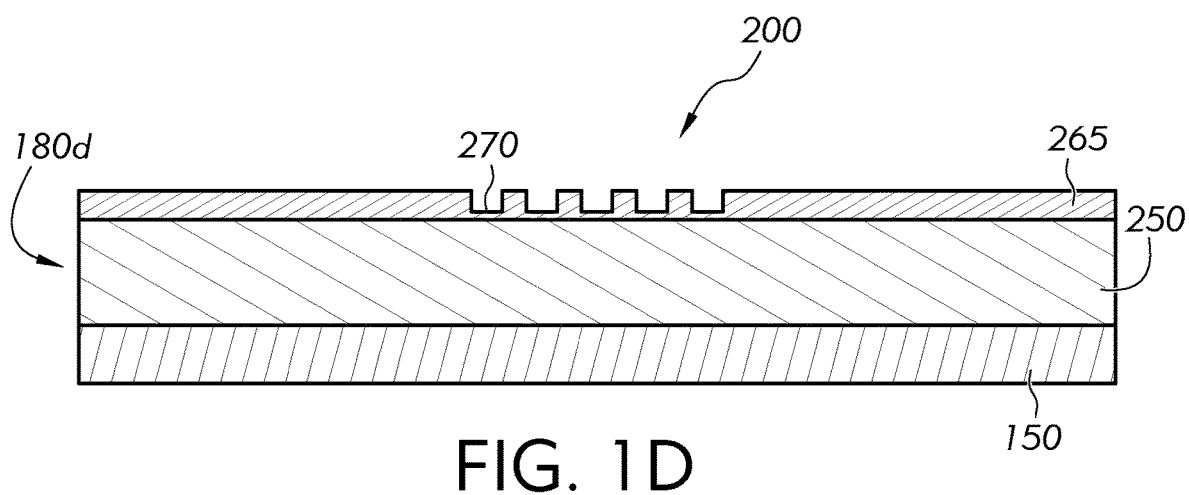
FIG. 1D schematically depicts a cross-sectional view of a portion of the grating coupler depicted in FIG. 1C, according to one or more embodiments described herein.

Referring now to FIG. 1D, a cross-sectional view of the third polarization splitting grating 180-*c* through the line II-II of FIG. 1C is schematically depicted. In embodiments, the cross-sectional view depicted in FIG. 1D is representative of the structure of the entirety of the structure of the receiving optical device 115 described herein. For example, various layers depicted in FIG. 1D, such as the substrate 150 may extend throughout the entirety of the receiving optical device 115. As depicted, the third polarization splitting grating 180-*c* comprises the substrate 150, a buried oxide layer 260 and an upper layer 265. In embodiments, the substrate 150 comprises a silicon substrate, a silicon on insulator substrate, or any other suitable type of substrate typically used in photonic integrated circuits. The buried oxide layer may be constructed of a dielectric layer such as silicon dioxide. The upper layer 265 may be constructed of silicon.

In the depicted embodiment, the first plurality of scattering elements 200 comprise a plurality of cavities 270 formed in the upper layer 265. In the depicted embodiment, the plurality of cavities 270 are each of the same depth. It should be understood that, in embodiments, the first plurality of scattering elements 200 may include a plurality of cavities 270 having non-uniform depths. In embodiments, the first and second pluralities of scattering elements 200 and 202 may comprise different depths. In embodiments, the first plurality of scattering elements 200 are formed via electron beam lithography of photolithography using a pattern corresponding to a desired distribution of the plurality of cavities 270, followed by a reactive etching step (e.g., reactive ion etching) to remove portions of the upper layer 265 to form the first plurality of scattering elements 200. In embodiments, the plurality of cavities extend only partially through the upper layer 265. In embodiments, the plurality of cavities extend through an entire thickness of the upper layer 265. While the depicted embodiment implements the first plurality of scattering elements 200 as negative features etched into the upper layer 265, it should be appreciated that embodiments are also envisioned where the first plurality of scattering elements 200 (and the second plurality of scattering elements 202) are implemented as positive features (e.g., pillars) disposed on top of the upper layer 265. In embodiments, the third polarization splitting grating 180-*c* (and each of the other plurality of polarization splitting gratings 180) comprises a cladding layer (not depicted) disposed thereon. Each of the pluralities of scattering elements 200 and 202 of each grating may be encapsulated in the cladding layer (e.g., a silicon oxide layer deposited by plasma-enhanced chemical vapor deposition) to provide the appropriate refractive index contrast to facilitate coupling.

In embodiments, additional components of the receiving optical device 115 may be formed in common layers as the plurality of polarization splitting gratings 180 of the coupler 135. For example, in embodiments, the first and second mode converters 235 and 240 extending from each of the plurality of polarization splitting gratings 180 and the plurality of optical communications links 145 may be formed within or on the upper layer 265 in the same lithography/etching sequence as the first plurality of scattering elements 200. For example, the first and second discretized permittivity distributions of the first and second mode converters 235 and 240 for coupling the light into the waveguides may be achieved by etching a plurality of holes in the upper layer 265 in positions determined via the optimization techniques described herein. The plurality of optical communications links 145 may also be formed by patterning the upper layer 265 using any suitable technique.

Figure 1E:
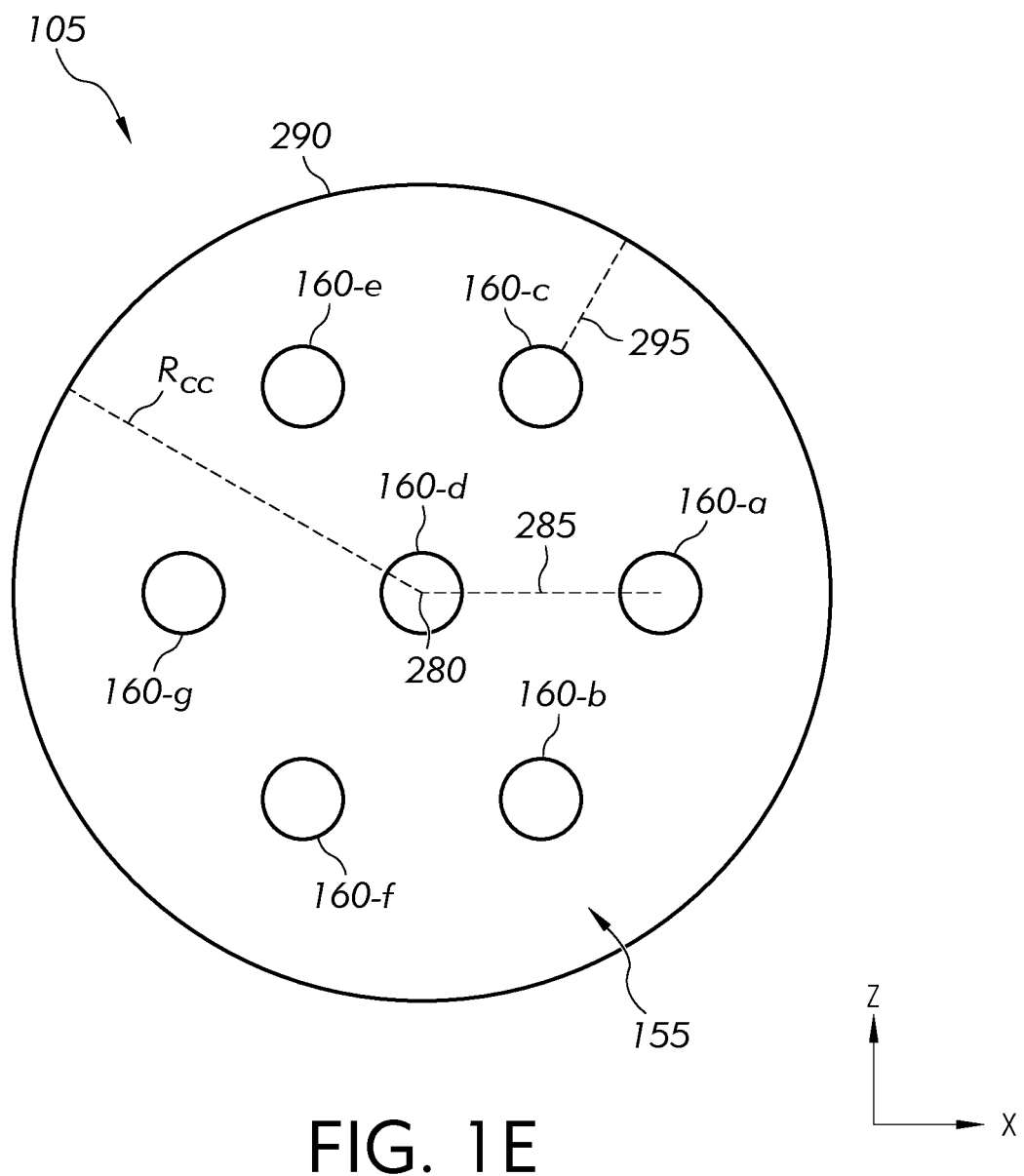
FIG. 1E schematically depicts a cross-sectional view of the multi-core optical fiber depicted in FIG. 1B, according to one or more embodiments described herein.

FIG. 1E depicts a cross-sectional view of the multi-core optical fiber 105 through the line I-I depicted in FIG. 1B. As depicted, the multi-core optical fiber 105 comprises the first core 160-*a*, the second core 160-*b*, the third core 160-*c*, the fourth core 160-*d*, the fifth core 160-*e*, the sixth core 160-*f*, and the seventh core 160-*g* disposed in the common cladding 155. The common cladding 155 comprises an outer edge 290 that defines a common cladding radius $R_{cc}$ (extending radially between the outer edge 290 and a longitudinal centerline 280 of the multi-core optical fiber 105) and an outer diameter of the multi-core optical fiber 105. In embodiments, $R_{cc}$ is less than or equal to 100 μm (e.g., less than or equal to 75 μm, less than or equal to 65 μm, less than or equal to 62.5 μm) such that the outer diameter of the multi-core optical fiber 105 is less than or equal to 200 μm (e.g., less than or equal to 150 μm, less than or equal to 130 μm, less than or equal to 125 μm). In embodiments, edges of the plurality of cores 160 are spaced apart from the outer edge 290 by at least a minimum core edge to fiber edge distance 295. As depicted in FIG. 1E, the minimum core edge to fiber edge distance 295 is the minimum distance from a point along the outer circumference of a core to a nearest point along the circumference of the outer edge 290, as determined by a line segment between the point along the outer circumference of the core and the nearest point along the circumference on the outer edge 290 in a plan perpendicular to the longitudinal centerline 280. In embodiments, the minimum core edge to fiber edge distance 295 is greater than or equal 8 microns. In embodiments, the minimum core edge to fiber edge distance 295 is greater than or equal 12 microns. In embodiments, the minimum core edge to fiber edge distance 295 is greater than 15 microns. Without intending to be bound by any particular theory, it is believed that the extent of signal loss due to tunneling is dependent upon the minimum value for the minimum core edge to fiber edge distance 295.

In the depicted embodiment, the plurality of cores 160 are disposed in a hexagonal lattice arrangement with the fourth core 160-d extending through the longitudinal centerline 280. Each of the plurality of cores 160 forms an equilateral triangle with the fourth core 160-d and another one of the plurality of cores 160 such that each core comprises two adjacent cores separated therefrom by a minimum core-to-core separation distance 285. In embodiments, centerlines of each of the plurality of cores 160 are separated from the centerlines of the two adjacent cores by the minimum core-to-core separation distance 285. In embodiments, the minimum core-to-core separation distance 285 is greater than or equal to 20 µm to facilitate relatively low crosstalk between the plurality of cores 260. In embodiments, the minimum core-to-core separation distance 285 is less than or equal to 45 µm (e.g., less than or equal to 40 µm, less than or equal to 35 µm, less than or equal to 30 µm, less than or equal to 25 µm, less than or equal to 22 µm). Such a low minimum core-to-core separation distance facilitates the multi-core optical fiber 105 including a relatively high number of cores to increase data transmission rates, but also creates difficulties in coupling the multi-core optical fiber 105 to an integrated photonic device via a grating coupler, as described herein.

In embodiments, each of the plurality of cores 160 comprises a relatively high index core region surrounded by one or more relatively low index inner claddings. The refractive index profile of each of the plurality of cores 160 may be designed to achieve a mode field diameter at a particular wavelength that is suitable for the particular application. In embodiments, the mode field diameters of each of the plurality of cores 160 is greater than or equal to 5 µm (e.g., greater than or equal to 8 µm, greater than or equal to 10 µm) to facilitate coupling to standard single mode fibers in existing optical interconnects. As described herein, the mode field diameters of each of the plurality of cores 160 may correspond to the dimensions of the plurality of polarization splitting gratings 180 of the coupler 135.

While the embodiment described herein with respect to FIGS. 1A-1E includes a multi-core optical fiber 105 with 7 cores such that 14 different polarization modes are coupled to 14 waveguides on the receiving optical device 115, it should be appreciated that embodiments with different numbers and arrangements of cores are contemplated and within the scope of the present disclosure. For example, in embodiments, the multi-core optical fiber 105 comprises only three cores arranged at apexes of an equilateral triangle (e.g., each core is separated from the other core by the minimum core-to-core separation distance 285 discussed above). The equilateral triangle may be centrally disposed within the common cladding 155 such that the longitudinal centerline extends through the a center of the equilateral triangle. In another example, the multi-core optical fiber 105 comprises 4 cores disposed in a 2×2 arrangement, with each of the cores being disposed at a corner of a square. In this example, each core may be separated from two the of the other cores by the minimum core-to-core separation distance 285. In another example, the multi-core fiber comprises 4 cores disposed in a 1×4 arrangement. In embodiments, the multi-core optical fiber 105 may comprise more than 7 cores (e.g., 8 cores disposed in a 2×4 arranged, with each core may be separated from two the of the other cores by the minimum core-to-core separation distance 285). Embodiments are also envisioned where the multi-core optical fiber 105 comprises unequally spaced cores (e.g., cores that are nearest to one another may be separated by different distances). The multi-core optical fiber 105 may include any number of cores (e.g., 3, 4, 5, 6, 7, 8, 9, 10, 11, 12, 13, 14, 15) consistent with the present disclosure.

In certain applications with relatively high data rate requirements, it may be beneficial to incorporate a relatively large number of cores in the multi-core optical fiber 105. For example, it may be beneficial to incorporate greater than or equal to 5 cores (e.g., 6 cores, 7 cores, 8 cores, 9 cores, 10 cores) in the multi-core optical fiber 105. It may also be beneficial to maintain the outer diameter of the multi-core optical fiber 105 within certain requirements to facilitate coupling with other components of the optical transmission system 100. For example, in embodiments, the multi-core optical fiber 105 comprises an outer diameter of 125 µm (i.e., $R_{cc}$=62.5 µm) to facilitate compatibility with standard single mode fiber components. Such a high number of cores in a fiber having such a size, in addition to other requirements (e.g., the core edge to fiber edge separation distance), constrains the minimum core-to-core separation distances between adjacent cores. As described herein, reducing the minimum core-to-core separation distance creates difficulties in maintaining polarization diversity as there are size constraints associated with grating couplers.

Figure 2A:
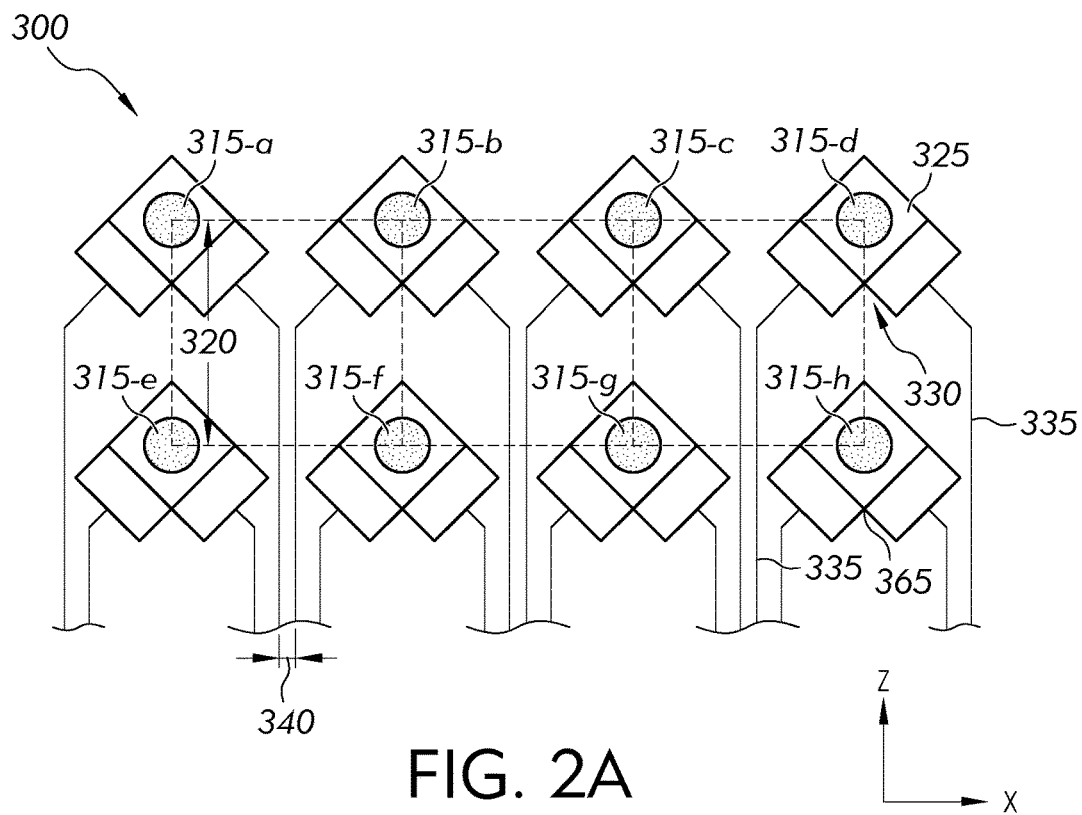
FIG. 2A schematically depicts a grating coupler comprising a plurality of polarization splitting gratings arranged in a manner that corresponds to a first plurality of cores of a multi-core optical fiber, according to one or more embodiments described herein.
Figure 2B:
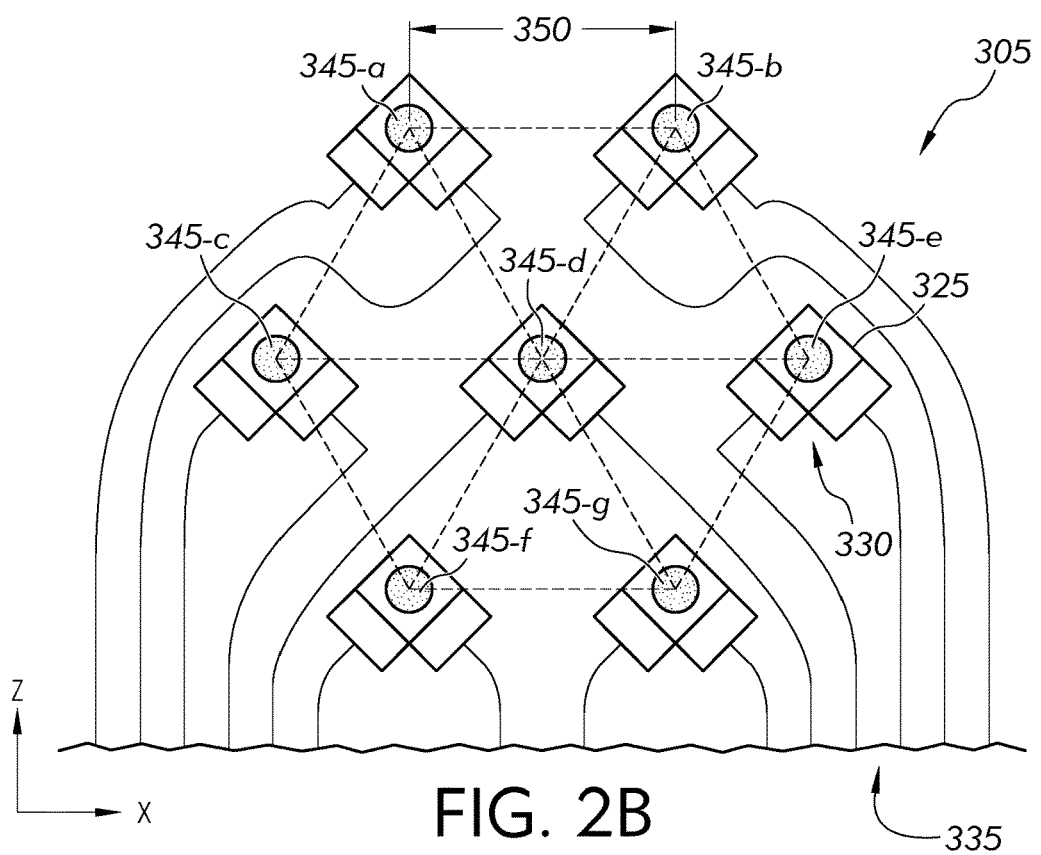
FIG. 2B schematically depicts a grating coupler comprising a plurality of polarization splitting gratings arranged in a manner that corresponds to a second plurality of cores of a multi-core optical fiber, according to one or more embodiments described herein.
Figure 2C:
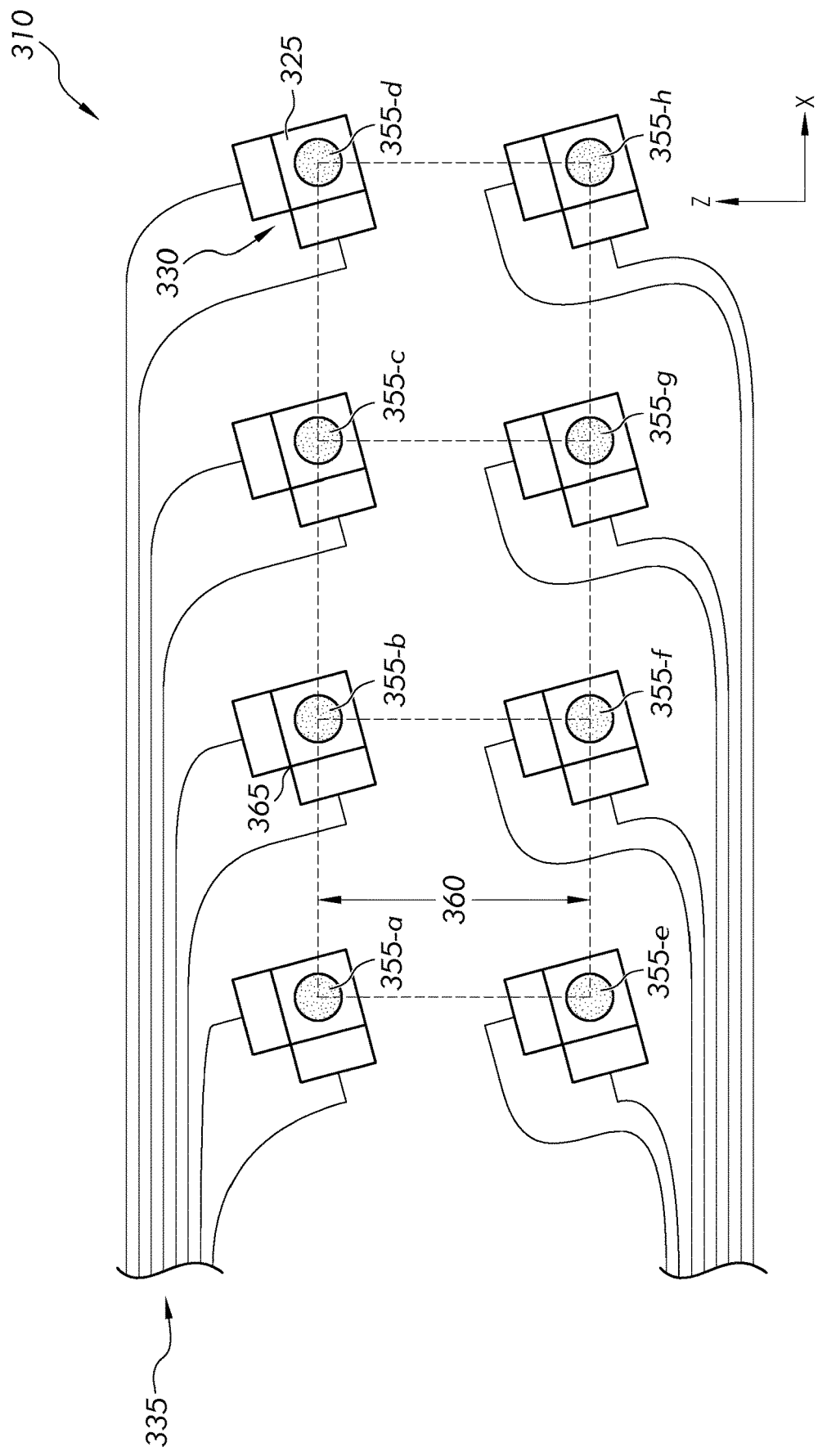
FIG. 2C schematically depicts a grating coupler comprising a plurality of polarization splitting gratings arranged in a manner that corresponds to a third plurality of cores of a multi-core optical fiber, according to one or more embodiments described herein.
Figure 3A:
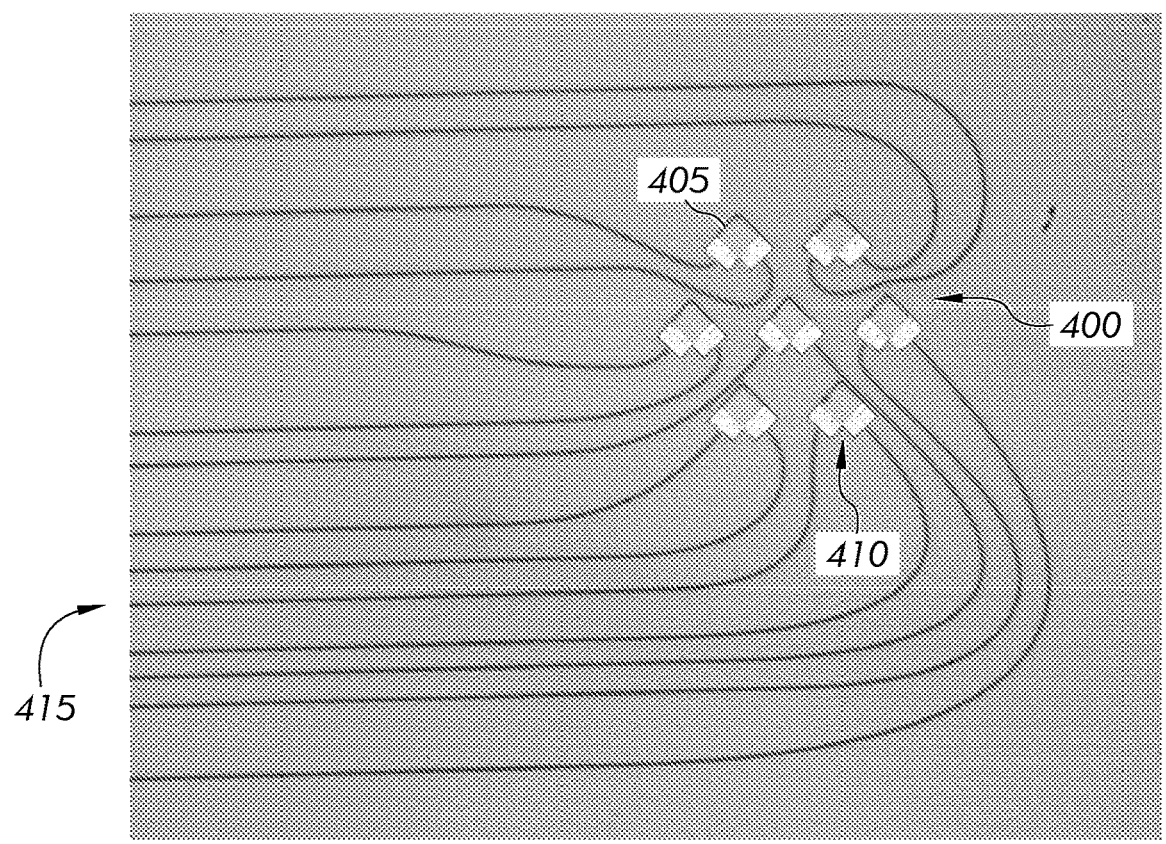
FIG. 3A depicts an image of a grating coupler comprising a plurality of polarization splitting gratings arranged in a manner corresponding to 7 cores of a multi-core optical fiber with a minimum core-to-core separation distance of 32 μm, according to one or more embodiments described herein.

The ultra-compact polarization splitting gratings and mode couplers described herein facilitate maintaining polarization diversity of the plurality of optical signals propagating through multi-core optical fibers having densely packed cores. For example, FIGS. 2A-2C depict example grating couplers 300, 305, and 310 configured for coupling different multi-core optical fibers to an integrated photonic device. The circles in each of FIGS. 2A-2C depict the arrangement of cores in the multi-core optical fiber that each of the grating couplers 300, 305, and 310 is designed to couple into an integrated photonic device. For example, the grating coupler 300 of FIG. 3A is designed to couple a multi-core optical fiber comprising a plurality of cores 315 (e.g., a first core 315-a, a second core 315-b, a third core 315-c, a fourth core 315-d, a fifth core 315-e, a sixth core 315-f, a seventh core 315-g, and an eighth core 315-h) arranged in a 2×4 arrangement such that centers of each of the cores are separated by a minimum core-to-core separation distance 320 that is less than or equal to 30 µm (e.g., 25 µm).

The grating coupler 300 comprises a plurality of polarization splitting gratings 325 that are arranged in a manner that corresponds to the plurality of cores 315 (e.g., adjacent ones of the plurality of polarization splitting gratings 325 are separated from each other by a minimum grating-to-grating separation distance that corresponds to the minimum core-to-core separation distance 320). The polarization splitting gratings 325 may be square-shaped and comprise a length greater than or equal to a mode field diameter of the plurality of cores 315. For example, in embodiments, each of the plurality of cores 315 comprises a mode field diameter of 8 µm, and the polarization splitting gratings 325 comprise 10 µm by 10 µm squares. The polarization splitting gratings 325 may correspond in structure to the plurality of polarization splitting gratings 180 described herein with respect to FIGS. 1A-1E, and diffract light from different polarization modes in different directions. The grating coupler 300 further comprises a pair of mode converters 330 (e.g., similar to the first mode and second mode converters 235 and 240 described herein) extending from each of the polarization splitting gratings 325 to couple the polarization modes to a pair of waveguides 335 extending from the pair of mode converters 330. In embodiments, the mode converters were iteratively constructed to possess arbitrary permittivity distributions given predetermined size constraints. For example, in embodiments, each mode converter in the pair of mode converters 330 comprises a width of 5 μm in the propagation direction of the light propagating therethrough (e.g., each mode converter may comprise a 10 μm by 5 μm rectangular shape). As such, the combination of one of the polarization splitting gratings 325 and the pair of mode converters 330 comprises a combined cross-sectional area of 200 μm². As depicted, such compactness facilitates coupling 16 waveguides to different polarization modes propagating through the plurality of cores 315, while still maintaining a minimum waveguide-to-waveguide separation distance 340 to avoid significant cross-talk. In embodiments, minimum waveguide-to-waveguide separation distance 340 is greater than or equal to 1 μm.

FIG. 2B depicts another grating coupler 305 designed to couple a plurality of cores 345 (a first core 345-*a*, a second core 345-*b*, a third core 345-*c*, a fourth core 345-*d*, a fifth core 345-*e*, a sixth core 345-*f*, and a seventh core 345-*g*) to an integrated photonic device. The plurality of cores 345 are arranged in a hexagonal lattice arrangement such that each one of the plurality of cores 345 is separated from two of the other cores by a minimum core-to-core separation distance 350 that is less than or equal to 30 μm (e.g., 25 μm). The grating coupler 305, like the grating coupler 300 described with respect to FIG. 2A, comprises a plurality of polarization splitting gratings 325, with a pair of mode converters 330 extending from sides of each of the polarization splitting gratings 325 to couple two polarization modes from one of the plurality of cores into a pair of waveguides 335 extending from the pair of mode converters 330. Despite the relatively low minimum core-to-core separation distance 350 of 25 μm, polarization diversity can still be maintained when coupling the 7 cores to an integrated photonic device.

FIG. 2C depicts another grating coupler 310 designed to couple a plurality of cores 355 (a first core 355-*a*, a second core 355-*b*, a third core 355-*c*, a fourth core 355-*d*, a fifth core 355-*e*, a sixth core 355-*f*, a seventh core 355-*g*, and an eighth core 355-*h*) to an integrated photonic device. The plurality of cores 355 are arranged in a 2×4 arrangement such that centers of each of the cores are separated by a minimum core-to-core separation distance 360 that is less than or equal to 25 μm (e.g., 22 μm). That is, in FIG. 2C, the multi-core optical fiber comprises a similar arrangement of cores as the example of FIG. 2A, but the minimum core-to-core separation distance is 3 μm smaller (reduced from 25 μm to 22 μm). The grating coupler 310, like the grating coupler 300 described with respect to FIG. 2A, comprises a plurality of polarization splitting gratings 325, with a pair of mode converters 330 extending from sides of each of the polarization splitting gratings 325 to couple two polarization modes from one of the plurality of cores into a pair of waveguides 335 extending from the pair of mode converters 330. Despite the relatively low minimum core-to-core separation distance 350 of 22 μm, polarization diversity can still be maintained when coupling the 8 cores to an integrated photonic device.

A distinction worth noting between the example grating couplers 300 and 310 depicted in FIGS. 2A and 2C is the orientation of the polarization splitting gratings 325 and pair of mode converters 330. In FIG. 2A, the ultimate propagation direction of the coupled light in the waveguides 335 external to the grating coupler 300 is downward (e.g., the negative y-direction depicted in FIG. 2A), perpendicular to the lengthwise direction of the rows of the grating array. Corners 365 of each of the polarization splitting gratings 325 extending between the pair of mode converters 330 point in the downward direction, parallel to the direction that the light is guided by the waveguides external to the grating coupler 300.

In FIG. 2C, the relative orientation of the polarization splitting gratings 325 is adjusted to compensate for the reduced grating spacing. As depicted in FIG. 2C, the ultimate propagation direction of the coupled light in the waveguides 335 external to the grating coupler 310 is to the side (e.g., the negative x-direction depicted in FIG. 2C), parallel to the lengthwise direction of the rows of the grating array. The polarization splitting gratings 325 are rotated relative to the orientation depicted in FIG. 2A such that the corners 365 no longer point downward, but rather to the side closer to the ultimate propagation direction of the light coupled to the waveguides. As a result of this rotation of the polarization splitting gratings 325, sides thereof including the mode converters are no longer adjacent to sides of other ones of the polarization splitting gratings 325 including mode converters, thereby providing more space between the gratings for routing the waveguides.

As such, through careful selection of the orientation of the polarization splitting gratings 325 relative to the ultimate direction that the light is guided on the integrated photonic device, various different combinations of core arrangements may be accommodated. In the embodiments described herein, the polarization splitting gratings 325 had a common orientation and the pairs of mode converters 330 extended off the same sides of each of the polarization splitting gratings 325. It should be appreciated that embodiments are also envisioned where the polarization splitting gratings in a grating coupler have different orientations (e.g., such that the corners 365 point in different directions) and/or the mode converters 330 extend off different sides from grating to grating are also contemplated and within the scope of the present disclosure, with the understanding that, in such embodiments, the polarization splitting gratings may be individually designed depending on the orientation thereof relative to the desired propagation directions.

EXAMPLE

An example grating coupler to couple 14 polarization modes associated with 7 cores of a multi-core optical fiber having the structure of the multi-core optical fiber 105 depicted in FIG. 1E was fabricated. The plurality of cores 160 had a mode field diameter of 8 μm at 1550 nm with a minimum core-to-core separation distance of 32 μm. The multi-core optical fiber had an outer diameter of 125 μm.

A grating coupler 400 (depicted in FIG. 3A) was fabricated on a silicon on insulator substrate. The grating coupler 400 comprised a buried oxide layer (e.g., corresponding to the buried oxide layer 260 depicted in FIG. 1D) having a thickness of 3 μm and a silicon layer (e.g., corresponding to the upper layer 265 depicted in FIG. 1D with a thickness of 250 nm. The silicon layer was patterned via electron-beam lithography with minimal features sizes of 100 nm. Two lithography steps (a full etch of the silicon layer or a 120 nm partial etch) were available. Reactive ion etching was performed to form the scattering elements of the polarization splitting gratings and waveguides. The gratings were partially etched through the silicon layer, while the mode converters and waveguides were formed by etching the full thickness of the silicon layer. Waveguides having a nominal width of 450 nm were formed in the lithography and etching steps. After etching, the chip was clad with a 1 µm layer of silicon dioxide through plasma-enhanced chemical vapor deposition.

Figure 3B:
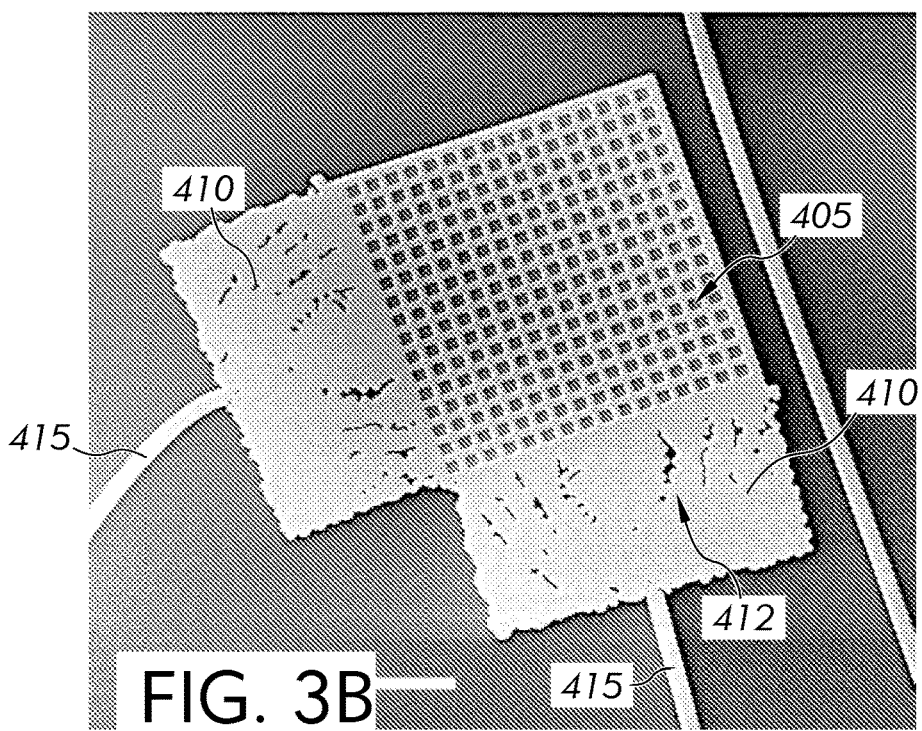
FIG. 3B depicts an image of one of the polarization gratings of the grating coupler depicted in FIG. 3A, according to one or more embodiments described herein.

The fabricated grating coupler 400 is depicted in FIG. 3A. The grating coupler 400 comprises 7 two-dimensional gratings 405 that are substantially square shaped with a length of 10 nm. FIG. 3B depicts a close-up view of one of the two-dimensional gratings 405. The two-dimensional gratings 405 were designed using the finite different time domain method. The gratings were designed for a 10° coupling angle. Each superimposed grating of the two-dimensional gratings 405 was orthogonal, and directed light in the different polarization modes in directions extending approximately 83.1° relative to one another to account for the 10° coupling angle. As depicted in FIGS. 3A and 3B, the grating coupler 400 comprised mode converters 410 extending from two adjacent sides of each of the two-dimensional gratings 405. The mode converters 410 connected each output of one of the two-dimensional gratings 405 to a 450 nm silicon waveguide 415. The mode converters 410 were designed using a gradient-based optimization software called Stanford Photonic Inverse design Software (SPINS) on an area of only 10 µm by 5 µm. As such, the combined cross-sectional area of each of the two-dimensional gratings 405 and its corresponding pair of mode converters 410 was 200 µm². As depicted in FIG. 3B, each of the mode converters 410 comprised a discretized permittivity distribution indicated via a plurality of perforations 412 extending into the silicon layer. The perforations 412 generally extend in a plurality of curved contours, with each curved contour having a tapered shape curving towards the waveguides 415 with increasing distance from one of the two-dimensional gratings 405.

Figure 3C:
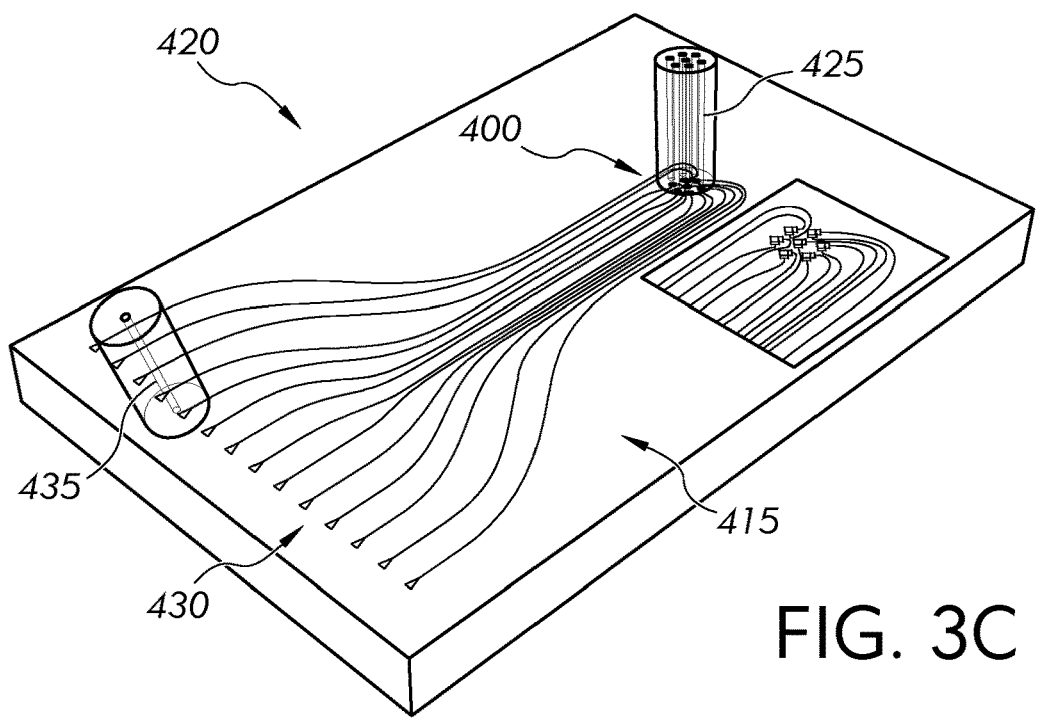
FIG. 3C depicts an image of an integrated photonic device and a multi-core optical fiber for testing the grating coupler depicted in FIG. 3A, according to one or more embodiments described herein.

The grating coupler 400 depicted in FIGS. 3A and 3B was modelled and tested using the testing device 420 depicted in FIG. 3C. The multi-core optical fiber 425 was held in spaced relation to the grating coupler such that each one of the two-dimensional gratings 405 was aligned with a core of the multi-core optical fiber 425. Optical signals from each of the cores was coupled into one of the waveguides 415 via one of the two-dimensional gratings 405. A plurality of one-dimensional gratings 430 was arranged at the end of each of the waveguides 415 to couple the light into a plurality of single mode fibers 435 for measurement.

Figure 3D:
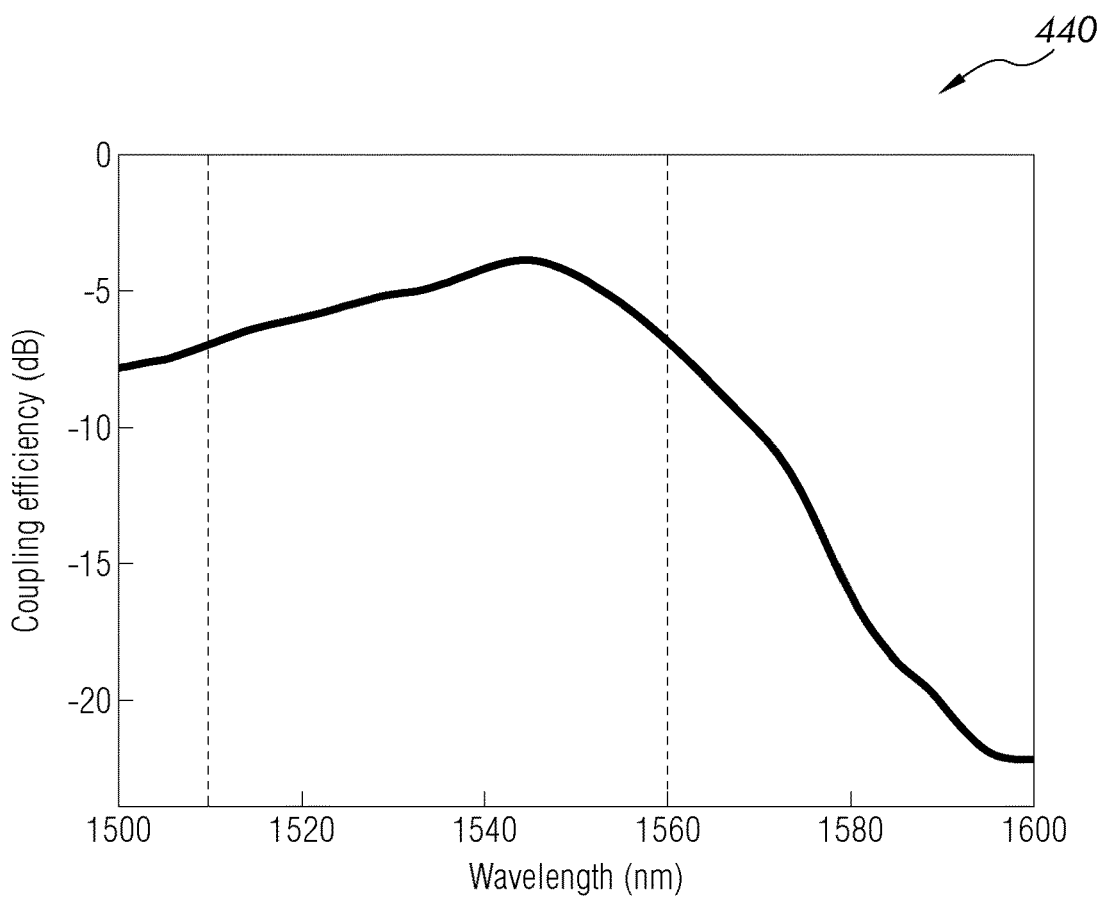
FIG. 3D depicts a plot of simulated coupling efficiency versus wavelength achieved during testing of the grating coupler depicted in FIG. 3A using the integrated photonic device depicted in FIG. 3C, according to one or more embodiments described herein.

A finite different time domain ("FDTD") simulation was conducted of the testing device 420. FIG. 3D depicts a plot 440 of the coupling efficiency for each mode being coupled to one of the single mode fibers 435. The FDTD simulated coupling efficiency for each mode is −3.8 dB with 57 nm of bandwidth. The mode converters 410 were simulated to have an insertion loss of −0.5 dB, which is relatively low considering their ultra-compact footprint. In embodiments, the grating couplers described herein have 3 dB coupling efficiency bandwidth of greater than or equal to 50 nm around 1550 nm.

Figure 3E:
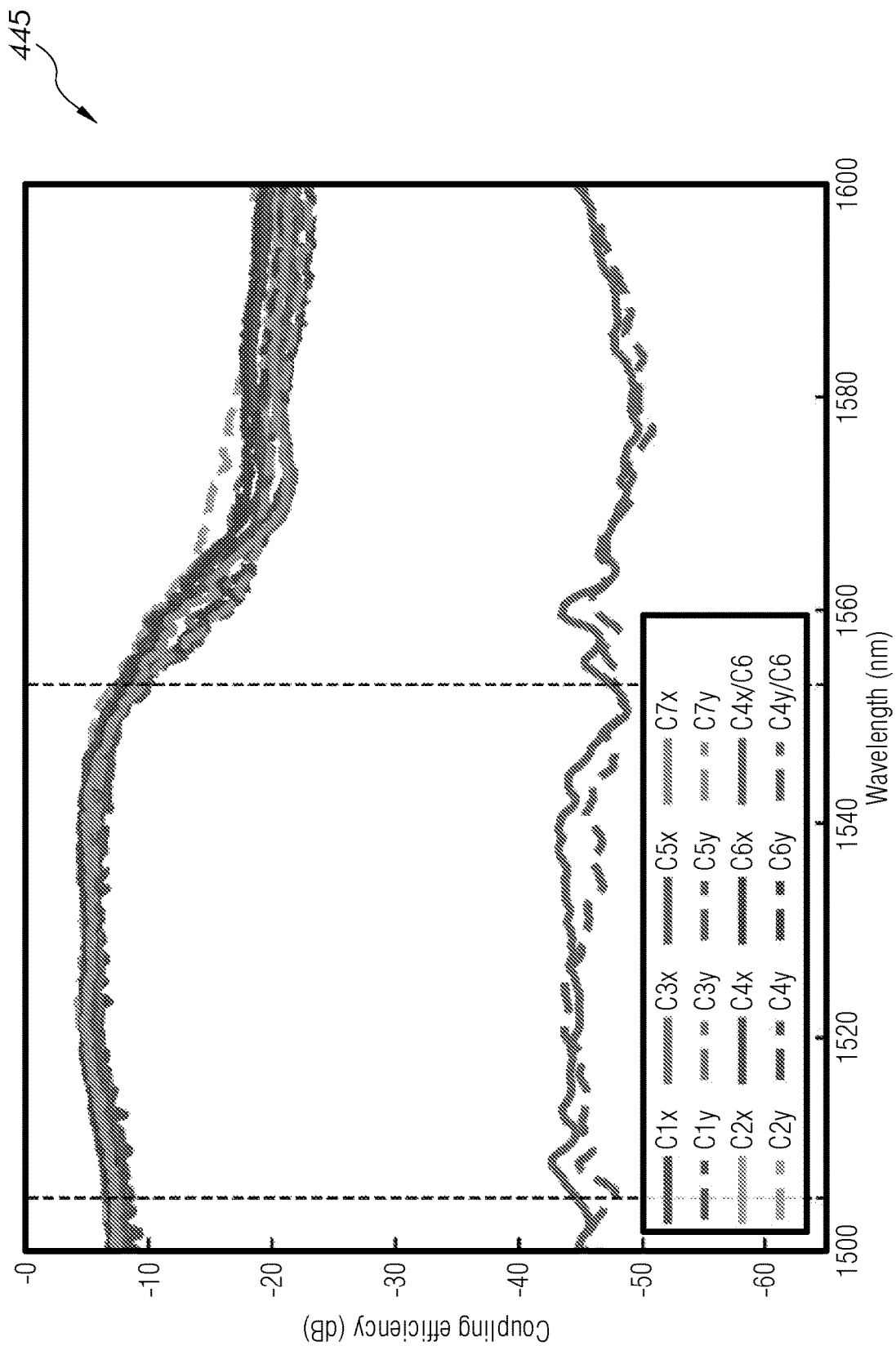
FIG. 3E depicts a plot of coupling efficiency for 14 polarization modes of the multi-core optical fiber depicted in FIG. 3C using the grating coupler depicted in FIG. 3A, as well as cross-talk between two of the cores, according to one or more embodiments described herein.

Physical testing of the grating coupler 400 was also performed by coupling light from a tunable continuous laser source into one of the single mode fibers 435, into one of the waveguides 415 via one of the plurality of one-dimensional gratings 430, and into one of the cores of the multi-core optical fiber 425 via one of the two-dimensional gratings 405 of the grating coupler 400. A detector collected light from the multi-core optical fiber 425 to determine the coupling efficiency of the grating coupler 400 for each polarization mode. A single mode fiber was aligned with one of the cores of the multi-core optical fiber 425 to guide the light to the detector, which comprised a power meter and an optical spectrum analyzer. The measured coupling efficiencies and inter-modal crosstalk between the fourth core (e.g., corresponding to the fourth core 160-d of FIG. 1E) and the sixth core (e.g., corresponding to the sixth core 160-g of FIG. 1E) are depicted in the plot 444 of FIG. 3E. As shown, the grating coupler 400 achieved a 3 dB-bandwidth of 48 nm, ranging from 1505 nm to 1553 nm. The highest coupling efficiency is −4.4 dB for the second core 160-b and lowest for first core 160-a, at −6.0 dB. These differences can be explained by the non-uniform spacing between the cores and the chip surface, as the fiber was not cleaved at an angle. On the other hand, the results show that the maximal polarization-dependent loss is only 0.4 dB, which can be attributed to small asymmetries in the fabricated devices and to the different bending radii of the feed waveguides. The maximal crosstalk was measured at 1509 nm: −36.4 dB, which is −28.4 dB below the coupling efficiency at this wavelength.

As is apparent from the foregoing description, fiber couplers may be used to couple a plurality cores of a multi-core optical fiber to an integrated photonic device. The fiber couplers comprise a plurality of polarization splitting gratings and a plurality of mode converters extending from multiple sides of each of the plurality of polarization splitting gratings. Topological optimization techniques may be used to design the polarization splitting gratings and mode converters for compactness and compatibility with multi-core optical fibers having tightly packed core structures. The compactness of the components of the grating couplers described herein facilitate maintaining polarization diversity when coupling multi-core optical fibers to integrated photonic devices, while still maintaining relatively high coupling efficiency and low cross-talk. The grating couplers described herein may be suitable for advanced communications systems where wavelength division multiplexing is combined with spatial division multiplexing and polarization diversity for high data rates.

It will be apparent to those skilled in the art that various modifications and variations can be made to the embodiments described herein without departing from the spirit and scope of the claimed subject matter. Thus it is intended that the specification cover the modifications and variations of the various embodiments described herein provided such modification and variations come within the scope of the appended claims and their equivalents.

What is claimed is:
1. An optical device comprising:
a multi-core optical fiber comprising a plurality of cores; and
a fiber coupler comprising:
a grating array comprising a plurality of polarization splitting gratings disposed on a substrate, the plurality of polarization splitting gratings arranged in a manner that corresponds to the plurality of cores in the multi-core optical fiber to receive an optical signal from one of the plurality of cores, wherein said plurality of polarization splitting gratings comprises a number of polarization splitting gratings that is less than or equal to the number of cores of said multi-core optical fiber;
a first mode converter extending from a first side of each of the plurality of polarization splitting gratings to receive a first polarization mode of the optical signal scattered by the polarization splitting grating;
a second mode converter extending from a second side of each of the plurality of polarization splitting gratings to receive a second polarization mode of the optical signal scattered by the polarization splitting grating; and a plurality of waveguides extending from ends of each of the mode converters to guide a single polarization mode of one of the optical signals, wherein the first mode converter and the second mode converter each comprise a plurality of nanostructures extending along curved contours, the curved contours extending toward a waveguide of the plurality of waveguides extending from the respective first mode converter or second mode converter.

2. The optical device of claim 1, wherein adjacent ones of the plurality of cores are separated from one another by a minimum core-to-core separation distance that is less than or equal to 45 μm.

3. The optical device of claim 1, wherein the multi-core optical fiber comprises a total diameter of less than or equal to 125 μm.

4. The optical device of claim 1, wherein the multi-core optical fiber comprises at least 2 cores such that 4 polarization modes are guided by the plurality of waveguides extending from the ends of each of the mode converters.

5. The optical device of claim 1, wherein the multi-core optical fiber comprises at least 5 cores such that 10 polarization modes are guided by the plurality of waveguides extending from the ends of each of the mode converters.

6. The optical device of claim 1, wherein adjacent ones of the plurality of cores are separated from one another by a minimum core-to-core separation distance that is less than or equal to 35 μm.

7. The optical device of claim 1, wherein the first and second sides of the plurality of polarization splitting gratings are at least as long as a mode field diameter of each the plurality of cores.

8. The optical device of claim 7, wherein the mode field diameter is greater than or equal to 5 μm and less than or equal to 25 μm.

9. The optical device of claim 7, wherein the first and second mode converters extending from each of the plurality of polarization splitting gratings comprise a dimension in a direction perpendicular to propagation directions of the first and second polarization modes that is less than or equal to 1.2 times the mode field diameter.

10. The optical device of claim 9, wherein the first and second mode converters extending from each of the plurality of polarization splitting gratings comprise a dimension in the propagation directions of the first and second polarization modes that is less than or equal to the mode field diameter.

11. The optical device of claim 1, wherein each polarization splitting grating and the first and second mode converters extending therefrom comprise a combined cross-sectional area that is less than or equal to 250 μm$^2$.

12. The optical device of claim 1, wherein centers of adjacent polarization splitting gratings of the grating array are separated from one another by a minimum grating separation distance that corresponds to a separation of the plurality of cores.

13. The optical device of claim 1, wherein each of the plurality of waveguides is separated from the other waveguides of the plurality of waveguides by at least a minimum waveguide separation distance of 500 nm.

14. The optical device of claim 1, wherein the plurality of waveguides are bent such that the plurality of waveguides extend outside of the grating array.

15. The optical device of claim 1, wherein at least one waveguide of the plurality of waveguides is bent such that, outside of the grating array, an extension direction of the at least one waveguide is changed by at least 90° relative to an initial extension direction thereof at a mode converter end thereof.

16. The optical device of claim 1, wherein at least one waveguide of the plurality of waveguides extends between two of the polarization splitting gratings within the grating array.

17. The optical device of claim 1, wherein each polarization mode of the optical signal is coupled into one of the plurality of waveguides with a coupling efficiency of greater than or equal to −6.0 dB.

18. The optical device of claim 1, wherein each polarization mode of the optical signal is coupled into one of the plurality of waveguides with a coupling efficiency that is greater than or equal to −10 dB and less than or equal to −0.5 dB.

19. The optical device of claim 1, wherein the fiber coupler couples both polarization modes of each optical signal in the plurality of waveguides with a 3 dB coupling efficiency bandwidth of greater than or equal to 50 nm around 1550 nm.

20. The optical device of claim 1, wherein the plurality of nanostructures comprise a minimum feature size of 100 nm.

21. The optical device of claim 1, wherein the first and second mode converters are substantially rectangular.

22. An optical device for coupling a multi-core optical fiber to a photonic device comprising:

a substrate;

a polarization splitting grating disposed on the substrate, the polarization splitting grating directing light of a first polarization mode in a first propagation direction towards a first side of the polarization splitting grating and light of a second polarization mode in second propagation direction towards a second side of the polarization splitting grating, wherein the first and second sides are greater than or equal to 10 μm and less than or equal to 15 μm in length; and first and second mode converters extending from the first and second sides of the polarization splitting grating, the first and second mode converters directing the first and second polarization modes in the first and second propagation directions into first and second waveguides extending from the first and second mode converters, respectively, wherein the first and second mode converters comprise lengths along the first and second propagation directions that are less than or equal to the lengths of the first and second sides of the polarization splitting grating, wherein the first mode converter and the second mode converter each comprise a plurality of nanostructures extending along curved contours, the curved contours extending toward a respective waveguide extending from the respective first mode converter or second mode converter.

23. The optical device of claim 22, wherein the polarization splitting grating, the first mode converter, and the second mode converter comprise a combined cross-sectional area of less than or equal to 250 μm$^2$.

24. The optical device of claim 23, wherein the first and second sides of the polarization splitting grating comprise lengths of greater than or equal to 10 μm.

25. The optical device of claim 22, wherein the first and second mode converters comprise lengths along the first and second propagation directions that are greater than or equal to 3 μm and less than or equal to 10 μm.

26. The optical device of claim 22, wherein the first and second mode converters direct the first and second polarization modes to the first and second waveguides with insertion losses of greater than or equal to −0.5 dB.

27. The optical device of claim 22, wherein the polarization splitting grating is a component of a grating array comprising a plurality of polarization splitting gratings, the plurality of polarization splitting gratings arranged in a manner corresponding to an arrangement of a plurality of cores in the multi-core optical fiber such that each of the plurality of polarization splitting gratings receives an optical signal from one of the cores.

28. The optical device of claim 27, further comprising a pair of mode converters extending from first and second sides of each of the plurality of polarization splitting gratings, each mode converter of the pair of mode converters directing a polarization mode of one of the optical signals into waveguides disposed at ends of each mode converter of the pair of mode converters.

29. The optical device of claim 28, wherein centers of adjacent polarization splitting gratings of the grating array are separated from one another by a minimum grating separation distance that is less than or equal to 50 um.

30. The optical device of claim 27, further comprising the multi-core optical fiber being held less than 50 μm above the substrate, such that one of the plurality of cores is aligned with one of the plurality of polarization splitting gratings of the grating array.

31. The optical device of claim 30, wherein the plurality of cores in the multi-core optical fiber comprise a minimum core-to-core separation distance that is less than or equal to 45 μm.

32. The optical device of claim 31, wherein adjacent cores of the plurality of cores in the multi-core optical fiber are separated by the minimum core-to-core separation distance and the minimum core-to-core separation distance is greater than or equal to 20 um and less than or equal to 25 μm.

33. The optical device of claim 30, wherein the multi-core optical fiber comprises a total diameter of less than or equal to 125 μm.

34. A method of coupling light from a multi-core optical fiber to a photonic integrated circuit, the method comprising:
transmitting a plurality of optical signals from a plurality of cores of the multi-core optical fiber onto a grating array of the photonic integrated circuit, the grating array comprising a plurality of polarization splitting gratings disposed on a substrate, the plurality of polarization splitting gratings arranged in a manner that corresponds to the plurality of cores in the multi-core optical fiber to receive one of the optical signals;
scattering light of each of the plurality of optical signals with one of the plurality of polarization splitting gratings such that first polarization modes and second polarization modes of the plurality of optical signals are directed in first and second propagation directions, respectively;
individually directing each of the first polarization modes and the second polarization modes into a plurality of waveguides using mode converters extending from each of the plurality of polarization splitting gratings, wherein:
the multi-core optical fiber comprises at least 5 cores such that at least 10 different polarization modes are directed into the plurality of waveguides via the mode converters; and
adjacent ones of the plurality of cores are separated by a core-to-core separation distance that is less than or equal to 45 μm,
wherein the mode converters extending from each of the plurality of polarization splitting gratings comprise a plurality of nanostructures extending along curved contours, the curved contours extending toward a waveguide of the plurality of waveguides extending from each of the respective mode converters.

35. The method of claim 34, wherein the multi-core optical fiber comprises a total diameter of less than or equal to 125 μm.

36. The method of claim 34, wherein a core-to-core minimum separation distance is less than or equal to 35 μm.

37. The method of claim 34, wherein the multi-core optical fiber comprises at least 2 cores such that at least 4 different polarization modes are directed into the plurality of waveguides via the mode converters.

38. The method of claim 34, wherein one of the polarization splitting gratings and a pair of the plurality of mode converters extending therefrom comprise a combined cross-sectional area of less than or equal to 250 μm$^2$.

* * * * *